United States Patent
Kim et al.

(10) Patent No.: US 8,006,159 B2
(45) Date of Patent: Aug. 23, 2011

(54) APPARATUS AND METHOD FOR TRANSMITTING/RECEIVING BROADCAST DATA IN A MOBILE COMMUNICATION SYSTEM

(75) Inventors: Yu-Chul Kim, Suwon-si (KR);
Hwan-Joon Kwon, Hwaseong-si (KR);
Dong-Hee Kim, Yongin-si (KR);
Youn-Sun Kim, Seongnam-si (KR);
Jin-Kyu Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/588,832

(22) Filed: Oct. 29, 2009

(65) Prior Publication Data

US 2010/0095182 A1    Apr. 15, 2010

Related U.S. Application Data

(62) Division of application No. 11/454,920, filed on Jun. 19, 2006.

(30) Foreign Application Priority Data

Jun. 17, 2005 (KR) .................................. 2005-52675
Sep. 13, 2005 (KR) .................................. 2005-85452

(51) Int. Cl.
*H04L 1/18* (2006.01)
(52) U.S. Cl. .................... 714/749; 714/748; 714/751
(58) Field of Classification Search .............. 714/749, 714/790, 748, 751, 752
See application file for complete search history.

(56) References Cited

U.S. PATENT DOCUMENTS

| | | | |
|---|---|---|---|
| 7,177,297 B2 * | 2/2007 | Agrawal et al. | 370/342 |
| 7,409,630 B1 * | 8/2008 | Wu et al. | 714/790 |
| 7,417,964 B2 * | 8/2008 | Cho et al. | 370/319 |
| 2003/0009226 A1 | 1/2003 | Graf | |
| 2003/0039226 A1 | 2/2003 | Kwak | |
| 2003/0153276 A1 | 8/2003 | Terry et al. | |
| 2004/0081123 A1 | 4/2004 | Krishnan | |
| 2004/0199846 A1 | 10/2004 | Matsumoto et al. | |
| 2005/0018633 A1 | 1/2005 | Shirota | |

FOREIGN PATENT DOCUMENTS

| | | | |
|---|---|---|---|
| KR | 1020010033925 A | 4/2001 | |
| KR | 1020030082103 A | 10/2003 | |
| KR | 1020040086038 A | 10/2004 | |

(Continued)

OTHER PUBLICATIONS

A Method for blind determination of pilot to data power ratio for QAM signals; TSG-RAN Working Group 1 Meeting;#21; Aug. 2001; pp. 1-2.

(Continued)

*Primary Examiner* — Fritz Alphonse
(74) *Attorney, Agent, or Firm* — Roylance, Abrams, Berdo & Goodman, L.L.P.

(57) ABSTRACT

A method and apparatus for transmitting a broadcast physical layer packet in a mobile communication system supporting multi-slot transmission and hybrid Automatic Repeat Request (H-ARQ) are provided. The method comprises initially transmitting the broadcast physical layer packet according to a fixed transmission format for at least one first slot interval and retransmitting the broadcast physical layer packet for at least one second slot interval using a variable transmission format different from the transmission format used in the first slot interval.

16 Claims, 11 Drawing Sheets

FOREIGN PATENT DOCUMENTS

| | | |
|---|---|---|
| RU | 2202855 | 4/2003 |
| WO | WO 94/08432 | 4/1994 |
| WO | WO 97/30531 | 8/1997 |
| WO | WO 01/26269 | 4/2001 |
| WO | WO 2004/047347 | 6/2004 |

OTHER PUBLICATIONS

Taeyoon Kim et al.; Pilot-to-data power ratio for maximizing the capacity of MIMO-OFDM; IEEE Transactions on Communications; Nov. 2004; pp. 1-30.

* cited by examiner

APPARATUS AND METHOD FOR TRANSMITTING/RECEIVING BROADCAST DATA IN A MOBILE COMMUNICATION SYSTEM

PRIORITY

This application is a division of U.S. patent application Ser. No. 11/454,920, filed Jun. 19, 2006, which claims the benefit under 35 U.S.C. §119(a) of application Serial No. 2005-52675, filed in the Korean Intellectual Property Office on Jun. 17, 2005, and application Serial No. 2005-85452, filed in the Korean Intellectual Property Office on Sep. 13, 2005, the entire disclosures of both of which are hereby incorporated by reference.

BACKGROUND OF THE INVENTION

1. Field of the Invention

The present invention relates generally to an apparatus and method for transmitting/receiving data in a mobile communication system. More particularly, the present invention relates to an apparatus and method for transmitting/receiving broadcast data in a mobile communication system.

2. Description of the Related Art

In general, mobile communication systems have been developed to support unicast service. The "unicast service" refers to the communication between a base station and one mobile station. That is, in the unicast service, the base station transmits data only to one mobile station, instead of transmitting the same data to a plurality of mobile stations. The voice service and various data services are the typical unicast services.

With the rapid progress of wireless communication technology, systems capable of enabling users to receive broadcast service while on the move have recently been developed and deployment thereof is at hand. The "broadcast service" refers to a process of transmitting the same service data from a base station to a plurality of mobile stations. The broadcast service can provide not only general over-the-air broadcast service but also a plurality of private broadcast services, and deployment of Digital Multimedia Broadcasting (DMB) service is close at hand.

Various attempts are being made to provide broadcast service even in mobile communication systems, and many schemes have been proposed so far. A High Rate Packet Data (HRPD) system proposed in 3rd Generation Partnership Project 2 (3GPP2) is a typical example of the system capable of supporting broadcast service among the mobile communication systems proposed up to now.

The HRPD system adopts a unicast transmission method as its basic transmission method, and also employs hybrid Automatic Repeat Request (H-ARQ). In addition, a Code Division Multiplexing (CDM)-based transmission method and an Orthogonal Frequency Division Multiplexing (OFDM)-based transmission method have been proposed as an example of a transmission method for Broadcast/Multicast Service (BCMCS) recently discussed in the mobile communication system. Herein, "BCMCS" refers to the broadcast service provided in the HRPD system, for convenience. A method for transmitting broadcast signals using H-ARQ uses a scheme for dividing one encoder packet (EP) into a plurality of sub-packets and transmitting the sub-packets using a plurality of slots, like the unicast scheme. A receiver receiving the sub-packets performs decoding thereon by combining the sub-packets using an Incremental Redundancy (IR) scheme. That is, a difference between the Broadcast/Multicast (BCMC) transmission scheme and the unicast transmission scheme lies in that if a mobile station transmits no response signal (ACK/NACK) to a base station in response to received data, the base station transmits a plurality of sub-packets constituting an encoder packet for a predetermined time corresponding to a predetermined number of slots. In the HRPD system, the unicast scheme and the BCMC scheme use the common encoding and decoding methods, and the well-known turbo encoding scheme can be used as the encoding method.

Most mobile communication systems for transmission packets, including the HRPD system, transmit data using multi-slot interlacing schemes. Of the multi-slot interlacing schemes, a 4-slot interlacing scheme is most typical.

With reference to FIG. 1, a description will now be made of the 4-slot interlacing scheme.

FIG. 1 is a timing diagram for a description of a 4-slot interlacing scheme used in an HRPD system.

As illustrated in FIG. 1, a transmitter transmits data to a receiver at intervals of 4 slots. That is, the transmitter performs first transmission (1st TX) 100 at a time of t0 to t1. The transmitted signal is received at the receiver before a time t2, and then processed. Thereafter, the receiver transmits a response signal (ACK/NACK) 105 in response to the first received signal 100. The response signal arrives at the transmitter before a time t4. If the response signal transmitted by the receiver indicates ACK (Good Reception), the transmitter transmits the next data. However, if the response signal transmitted by the receiver indicates NACK (Poor Reception), the transmitter retransmits the first transmitted data. For the retransmission, the transmitter performs second transmission (2nd TX) 110 in response to the response signal from the receiver at a time of t5 to t6. Similarly, the transmitted signal is received at the receiver before a time t7, and then processed. The receiver transmits a response signal (ACK/NACK) 115 in response to the received signal. The response signal arrives at the transmitter before a time t9.

As described above, based on the response signal from the receiver, the transmitter determines whether it will perform initial transmission or retransmission on the transmission data. That is, the transmitter performs the transmission at intervals of 4 slots. Therefore, for the remaining 3 slots where transmission to the receiver is not performed, the transmitter can transmit data to another mobile station, or can transmit data other than the currently transmitted data to the receiver using the remaining slots. This scheme is called the 4-slot interlacing scheme.

The 4-slot interlacing scheme is used for the following reasons. After the transmitter transmits a part of or all of the coded symbol created using one packet, if the receiver fails to receive the transmitted coded symbol, the transmitter should retransmit a part of or all of the coded symbol of the corresponding packet to increase reception capability of the receiver. In the HRPD system, the maximum number of retransmissions is limited to a predetermined value.

The use of the 4-slot interlacing scheme can provide different broadcast services at intervals of a predetermined number of slots. A description thereof will be made with reference to FIG. 2.

FIG. 2 is a timing diagram for a description of a scenario in which different broadcast services are provided at intervals of every slot in an HRPD system supporting a 4-slot interlacing scheme.

It is assumed in FIG. 2 that each of the parts hatched with oblique lines indicates a slot corresponding to a multiple of 4 (4n), and each of the parts hatched with horizontal lines indicates a slot that comes one slot after the multiple of 4. The slots hatched with the oblique lines and the slots hatched with the horizontal lines are the slots allocated for a particular broadcast service. It can be noted that the 4-slot interlacing scheme is applied even to the slots allocated for the broadcast service. A description will now be made of an exemplary method for transmitting packet data through each of the slots allocated for the broadcast service.

In FIG. 2, reference numeral 211 represents initial transmission of a first packet P1, reference numeral 212 represents first retransmission of the first packet P1, and reference numeral 213 represents second retransmission of the first packet P1. Thereafter, in the same slot of the interlacing scheme, the next packet, in other words a third packet P3 231 is transmitted. Although the number of transmissions is set such that one data packet can be transmitted up to 3, the number of transmissions is subject to change. Similarly, for a second packet P2, initial transmission 221, first retransmission 222 and second retransmission 223 are performed, and thereafter, the next packet, in other words a fourth packet P4 241 is transmitted. Similarly, for the third packet P3 and the fourth packet P4, initial transmissions 231 and 241, first retransmissions 232 and 242, and second retransmissions 233 and 243 are performed.

Various messages provided in the system to provide the broadcast service and a method for providing the broadcast service will now be described in detail hereinbelow. The HRPD system transmits packet transmission information for receipt of a broadcast physical layer packet (hereinafter simply referred to as "packet") for BCMCS using an overhead signaling message, for example a broadcast overhead message. The overhead signaling message includes therein a BCMC flow ID transmitted in the cell, information on Frequency Allocation (FA) for transmitting each BCMCS packet, position information of transmission slots, a data rate, the number of transmission slots, and Reed-Solomon (RS) coding information. A mobile station, after receiving the BCMCS overhead message, receives a corresponding packet in a corresponding slot using transmission information of the BCMCS packet that the user desires to receive.

Generally, because the BCMCS transmits the same information to a plurality of mobile stations, every base station transmits the same packets in a BCMCS slot in order to provide the BCMCS in the mobile communication system. The mobile station receives the packets from the base stations at once, and increases its reception performance through soft combining, noticeably increasing the performance compared with the method of receiving packets using a signal received from one cell.

The BCMCS transmits data over multiple slots by using the same transmission format in each slot. In this case, the BCMCS increases the number of retransmissions in the area where the reception performance is lower. The BCMCS uses the same transmission format, in other words the same OFDM symbol structure or modulation scheme, even in the area where the number of transmissions slots increases.

A structure of the OFDM symbol used in the BCMCS is designed taking into account the surrounding environment such as the maximum signal delay in the area where the receiver is located. Therefore, at the retransmission time, only some neighbor cells participate in the retransmission, reducing the maximum signal delay value of the OFDM signal that the receiver desires to receive. Generally, a Cyclic Prefix (CP) is inserted in the OFDM symbol taking the maximum signal delay into consideration. A size of the CP depends upon the possible amount of transmission data. That is, an increase in the size of the CP causes a decrease in the possible amount of transmission data, and a decrease in the size of the CP increases the possible amount of transmission data. However, the current BCMCS scheme does not take the changed surrounding environment into account during retransmission, and uses the fixed transmission format. As a result, the CP is set unnecessarily long, causing a waste of radio resources.

Accordingly, there is a need for an improved apparatus and method for transmitting and receiving broadcast data in a mobile communication system.

SUMMARY OF THE INVENTION

Exemplary embodiments of the present invention address at least the above problems and/or disadvantages and provide at least the advantages described below. It is, therefore, an object of the present invention to provide an apparatus and method for adaptively transmitting data according to the surrounding environment when providing Broadcast/Multicast Service (BCMCS) using a multi-slot transmission scheme in a high-speed mobile communication system.

It is another object of the present invention to provide an apparatus and method for providing BCMCS by transmitting data in a variable transmission format according to the number of retransmissions in a high-speed mobile communication system.

It is further another object of the present invention to provide a transmission/reception apparatus and method for increasing efficiency of radio resources while providing BCMCS in a high-speed mobile communication system.

According to one exemplary aspect of the present invention, there is provided a method for transmitting a broadcast physical layer packet in a mobile communication system supporting multi-slot transmission and hybrid Automatic Repeat Request (H-ARQ). The method comprises initially transmitting the broadcast physical layer packet according to a fixed transmission format for at least one first slot interval and retransmitting the broadcast physical layer packet for at least one second slot interval using a variable transmission format different from the transmission format used in the first slot interval.

According to another exemplary aspect of the present invention, there is provided a method for receiving a broadcast physical layer packet in a mobile communication system supporting multi-slot transmission and hybrid Automatic Repeat Request (H-ARQ). The method comprises receiving transmission format information for the broadcast physical layer packet through a broadcast overhead message, receiving the broadcast physical layer packet that is initially transmitted in a fixed transmission format for at least one first slot interval, according to the transmission format information and receiving the broadcast physical layer packet that is retransmitted in a variable transmission format different from the transmission format used in the first slot interval for at least one second slot interval, according to the transmission format information.

According to further another exemplary aspect of the present invention, there is provided an apparatus for transmitting a broadcast physical layer packet in a mobile communication system supporting multi-slot transmission and hybrid Automatic Repeat Request (H-ARQ). The apparatus comprises a transmission unit for generating the broadcast physical layer packet such that initial transmission and retransmission differ from each other in a transmission format, a radio frequency (RF) unit for frequency-up-converting the broadcast physical layer packet generated in the transmission unit into an RF signal and a controller for controlling operations of the transmission unit and the RF unit so as to initially transmit the broadcast physical layer packet according to a fixed transmission format for at least one first slot interval, and retransmit the broadcast physical layer packet for at least one second slot interval using a variable transmission format different from the transmission format used in the first slot interval.

According to yet another exemplary aspect of the present invention, there is provided an apparatus for receiving a broadcast physical layer packet in a mobile communication system supporting multi-slot transmission and hybrid Automatic Repeat Request (H-ARQ). The apparatus comprises a radio frequency (RF) unit for converting the broadcast physical layer packet received over the air into a baseband signal, a reception unit for receiving the broadcast physical layer packet according to transmission formats used for initial transmission and retransmission, and restoring the received broadcast physical layer packet to an original signal and a controller for controlling operations of the RF unit and the reception unit so as to, upon receipt of a broadcast overhead message including transmission format information for the broadcast physical layer packet, receive the broadcast physical layer packet that is initially transmitted in a fixed transmission format for at least one first slot interval, according to the transmission format information, and to receive the broadcast physical layer packet that is retransmitted in a variable transmission format different from the transmission format used in the first slot interval for at least one second slot interval, according to the transmission format information.

According to still another exemplary aspect of the present invention, there is provided a mobile communication system that supports multi-slot transmission and hybrid Automatic Repeat Request (H-ARQ) and provides a broadcast service. The system comprises at least one base station for initially transmitting a broadcast physical layer packet according to a fixed transmission format for at least one first slot interval, and retransmitting the broadcast physical layer packet for at least one second slot interval using a variable transmission format different from the transmission format used in the first slot interval and at least one mobile station for, upon receipt of a broadcast overhead message including transmission format information for the broadcast physical layer packet from the base station, receiving the broadcast physical layer packets that are initially transmitted and retransmitted in the first and second slot intervals, according to corresponding transmission formats.

According to still another exemplary aspect of the present invention, there is provided a transmission method for a mobile communication system that supports multi-slot transmission and hybrid Automatic Repeat Request (H-ARQ) and uses an Orthogonal Frequency Division Multiplexing (OFDM) transmission scheme. The method comprises allocating at least one OFDM symbol to a transmission slot as an internal symbol, and allocating at least one OFDM symbol to each of a left side and a right side of the internal symbol as a boundary symbol and transmitting the OFDM symbol such that the boundary symbol and the internal symbol differ from each other in a pilot-to-data tone power ratio (PDR) in a first slot interval where initial transmission is performed and a second slot interval where retransmission is performed.

According to still another exemplary aspect of the present invention, there is provided a method for receiving a broadcast physical layer packet in a mobile communication system that supports multi-slot transmission and hybrid Automatic Repeat Request (H-ARQ) and uses an Orthogonal Frequency Division Multiplexing (OFDM) transmission scheme. The method comprises receiving transmission format information including pilot-to-data tone power ratio (PDR) information for at least one first slot interval where initial transmission for the broadcast physical layer packet is performed and at least one second slot interval where retransmission is performed, through a broadcast overhead message and receiving the broadcast physical layer packet by performing channel estimation for a corresponding slot interval based on the PDR information. At least one OFDM symbol is allocated as an internal symbol and at least one OFDM symbol is allocated to each of a left side and a right side of the internal symbol as a boundary symbol in each of the first and second slot intervals, and the PDR set in the first slot interval is different from the PDR set in the second slot interval.

According to still another exemplary aspect of the present invention, there is provided a transmission apparatus for a mobile communication system that supports multi-slot transmission and hybrid Automatic Repeat Request (H-ARQ) and uses an Orthogonal Frequency Division Multiplexing (OFDM) transmission scheme. The apparatus comprises a transmission unit for allocating at least one OFDM symbol to a transmission slot as an internal symbol, allocating at least one OFDM symbol to each of a left side and a right side of the internal symbol as a boundary symbol, and transmitting the OFDM symbol, the transmission unit including a pilot tone inserter for inserting a pilot tone in the OFDM symbol and a controller for controlling an operation of the pilot tone inserter such that the boundary symbol and the internal symbol differ from each other in a pilot-to-data tone power ratio (PDR) in a first slot interval where initial transmission is performed and a second slot interval where retransmission is performed.

According to still another exemplary aspect of the present invention, there is provided an apparatus for receiving a broadcast physical layer packet in a mobile communication system that supports multi-slot transmission and hybrid Automatic Repeat Request (H-ARQ) and uses an Orthogonal Frequency Division Multiplexing (OFDM) transmission scheme. The apparatus comprises a reception unit for receiving transmission format information including pilot-to-data tone power ratio (PDR) information for at least one first slot interval where initial transmission for the broadcast physical layer packet is performed and at least one second slot interval where retransmission is performed, through a broadcast overhead message, and receiving the broadcast physical layer packet, the reception unit including a channel estimator for performing channel estimation for a corresponding slot interval based on the PDR information and a controller for, upon receipt of the broadcast overhead message, controlling an operation of the channel estimator according to the PDR information, and controlling an overall operation of the reception unit according to the transmission format information. At least one OFDM symbol is allocated as an internal symbol and at least one OFDM symbol is allocated to each of a left side and a right side of the internal symbol as a boundary symbol in each of the first and second slot intervals, and the PDR set in the first slot interval is different from the PDR set in the second slot interval.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Exemplary embodiments of the present invention will now be described in detail with reference to the annexed drawings. In the following description, a detailed description of known functions and configurations incorporated herein has been omitted for clarity and conciseness.

Figure 1:
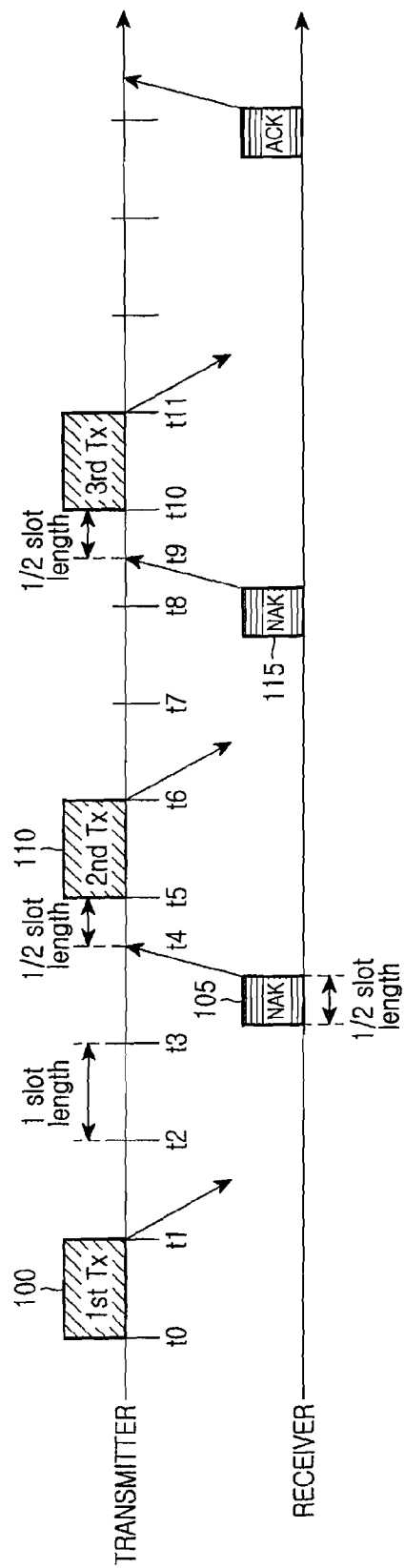
FIG. 1 is a timing diagram for a description of a 4-slot interlacing scheme used in an HRPD system.
Figure 2:
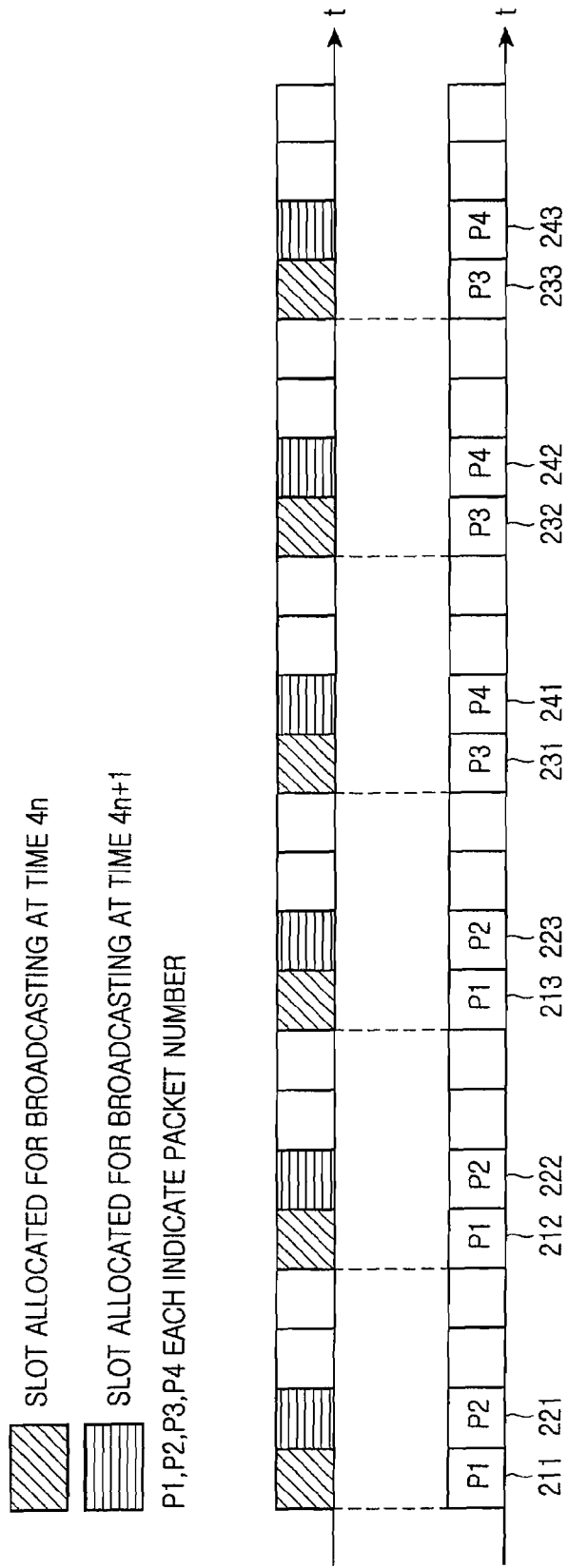
FIG. 2 is a timing diagram for a description of a scenario in which different broadcast services are provided at intervals of every slot in an HRPD system supporting a 4-slot interlacing scheme.
Figure 3:
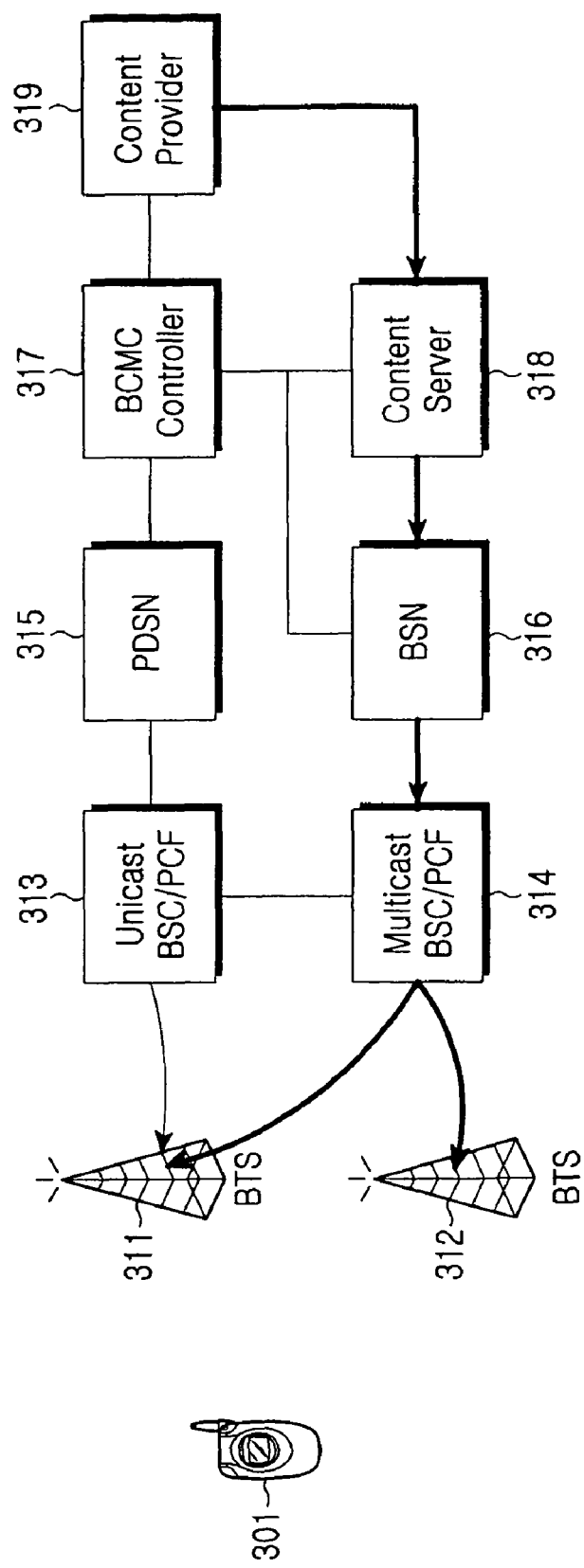
FIG. 3 is a diagram illustrating a configuration of a system for providing a broadcast service according to an exemplary embodiment of the present invention.

FIG. 3 is a diagram illustrating a configuration of a system for providing a broadcast service according to an exemplary embodiment of the present invention. With reference to FIG. 3, a description will now be made of the broadcast service system according to an exemplary embodiment of the present invention.

In FIG. 3, base stations (base transceiver systems (BTSs)) 311 and 312 are the final nodes that provide Broadcast/Multicast Service (BCMCS) to a mobile station (301). The base stations 311 and 312 provide broadcast services according to the broadcast schemes of their associated systems. It will be assumed herein that the base stations 311 and 312 are associated with a High Rate Packet Data (HRPD) system. A detailed structure and operation of the base station for providing the broadcast service will be described later with reference to the accompanying drawings. The base station provides the broadcast service using, for example, the 4-slot interlacing scheme described in the prior art section, and transmits data within the maximum number of transmissions. A format of the transmission data will be described in detail hereinbelow. The base stations 311 and 312 are connected to a unicast base station controller (BSC/PCF) 313 and a multicast base station controller (BSC/PCF) 314, respectively, and operate under the control of the corresponding BSCs/PCFs 313 and 314.

The BSCs/PCFs 313 and 314 control operations of the base stations 311 and 312, receive BCMC data from upper layers, and transmit the BCMC data to the corresponding base stations 311 and 312. The unicast BSC/PCF 313 performs a function of transmitting signaling information, and the multicast BSC/PCF 314 performs a function of transmitting broadcast contents. In this case, the unicast BSC/PCF 313 may provide the base stations 311 and 312 with the number of transmissions for broadcast service data, the number of transmission slots, and the positions of the transmission slots along with a broadcast overhead message. The unicast BSC/PCF 313 is connected to a packet control function (PCF) of an upper layer or the same layer, and expressed in a single entity.

The PCF in the unicast BSC/PCF 313 takes charge of various controls for a packet data service. The unicast BSC/PCF 313, an upper layer of which is connected to a packet data service node (PDSN) 315, can interwork with a BCMC controller 317. The BCMC controller 317 can receive control information for broadcast traffic data or multicast traffic data from a content provider 319. The multicast BSC/PCS 314 is connected to a broadcast serving node (BSN) 316. The BSN 316 serves to relay and deliver BCMC contents. The BSN 316 receives broadcast contents from a content server 318. The content server 318 receives broadcast contents from the content provider 319. In FIG. 3, the bold lines represent bearer paths through which broadcast contents are transmitted, and the solid lines represent signaling paths. The above-mentioned devices are logical devices, but they may be implemented in a single physical device in actual implementation.

A detailed description will now be made of operations of the base station 311 and the mobile station 301 when BCMC is achieved in the system described above.

The base station 311 will first be described. The base station 311 provides information on a possible broadcast service to the mobile station 301 through a broadcast overhead message. The broadcast overhead message is periodically transmitted, and when the mobile station 301 requests transmission of a particular broadcast service, the base station 311 performs an operation for transmission of the corresponding broadcast service. That is, if the base station 311 is currently receiving the requested broadcast traffic from the upper layer, it transmits the broadcast traffic in a multicast fashion. However, if the base station 311 is not currently receiving the requested broadcast traffic from the upper layer, it prepares to receive the requested broadcast traffic from the upper layer and multicast the received broadcast traffic. Upon completion of the preparation, the base station 311 multicasts the requested broadcast traffic so that the mobile station 301 may receive the broadcast traffic.

Generally, the broadcast signals are transmitted by several base stations at the same time. The base stations 311 and 312 periodically broadcast the broadcast overhead messages. All mobile stations located in coverage of the base stations 311 and 312 can receive the broadcast overhead messages, and the mobile station desiring to receive BCMCS should first receive the periodically transmitted broadcast overhead messages. Therefore, with the use of the broadcast overhead message, the base station provides the mobile station with various broadcast reception information, such as a BCMC flow ID, information indicating whether it is now providing the broadcast service, a period of the broadcast slot, an Extended BCMC (EBCMC) transmission format, a pilot to data tone power ratio (PDR), information indicating whether a dual PDR is set, a modulation method and the like.

The base station transmits an EBCMC transmission format of the broadcast traffic along with the broadcast overhead message according to an exemplary embodiment of the present invention. The EBCMC transmission format is a field indicating a particular transmission format. That is, the mobile station 301 and the base station 311 include a transmission format therein. Alternatively, the base station 311 provides the EBCMC transmission format to the mobile station 301 during initial registration, so the mobile station 301 and the base station 311 can be aware of the transmission format therebetween. Therefore, the base station 311 transmits the EBCMC transmission format information to the mobile station 301 when the mobile station 301 needs it at the initial operation. The base station 311 and the mobile station 301 according to an exemplary embodiment of the present invention, as they have an EBCMC transmission format set therein, can determine which format they will use, simply based on the EBCMC transmission format. In addition, when there is a need for authentication of a mobile station, upon receipt of an authentication request signal from the corresponding mobile station, the base station can forward the authentication request signal to an upper layer to perform the necessary procedure.

The mobile station 301 is an apparatus for receiving unicast or BCMC signals transmitted by the base station 311. Therefore, as described in the prior art section, the mobile station 301, when it receives a unicast service, can transmit a response signal (ACK/NACK) to the base station 311 in response to received data. However, the mobile station 301, when it receives BCMCS, receives a broadcast overhead message and broadcast traffic signal from the base station 311 and processes the received broadcast overhead message and broadcast traffic signal. After receiving the broadcast overhead message, the mobile station 301 attempts to receive broadcast signals using only the information for its desired broadcast service. If there is a need for authentication or registration, it performs the authentication or registration using a separate channel. The mobile station 301 can receive a transmission period of corresponding broadcasting, an EBCMC transmission format indicating a transmission format during multi-slot transmission, a PDR, dual PDR setting information and the like, through the broadcast overhead message, and receive BCMCS depending on the broadcast overhead message.

A description will now be made of a packet structure of the broadcast traffic transmitted through one slot in the HRPD system.

Figure 4:
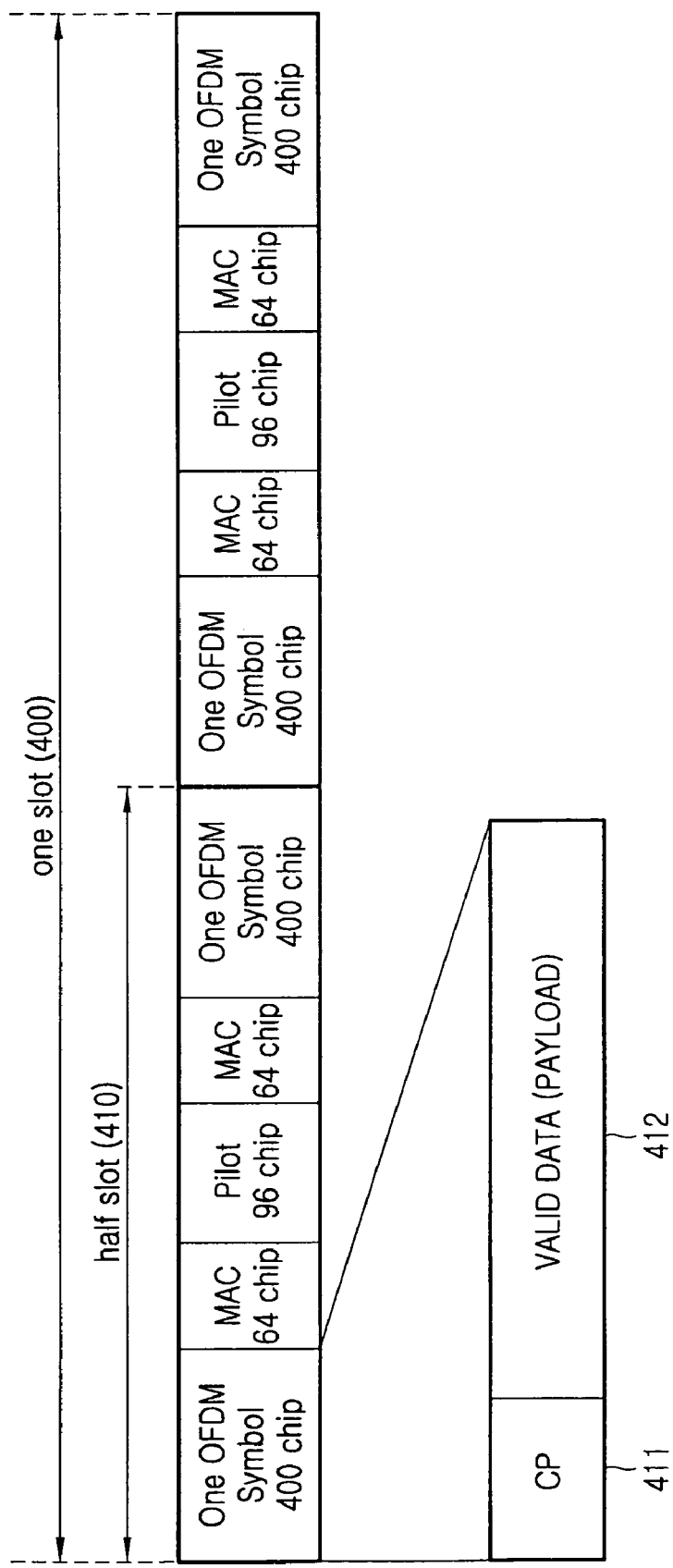
FIG. 4 is a diagram illustrating an exemplary format of packet data constituting one slot for a broadcast service in an HRPD system according to an exemplary embodiment of the present invention.

FIG. 4 is a diagram illustrating an exemplary format of packet data constituting one slot for a broadcast service in an HRPD system according to an exemplary embodiment of the present invention.

Referring to FIG. 4, one slot 400 is divided into half slots. The half slots have the same format, so only the first half slot 410 will be described. The half slot 410 is composed of a total of 1024 chips. Of the 1024 chips, the first 400 chips constitute data, the next 64 chips are used for medium access control (MAC), and the following 96 chips form a pilot symbol located in the center. Further, the next 64 chips form MAC, and the last 400 chips form data. It is assumed that the 400-chip data is transmitted by CDM if it is unicast data, and transmitted by OFDM if it is BCMCS data. It is assumed in FIG. 4 that the broadcast service type is BCMCS, so the 400-chip data forms one OFDM symbol.

The one OFDM symbol has a Cyclic Prefix (CP) 411 generated by copying the last part of a payload and attaching the copied part to the head of the payload. The CP, as described in the prior art section, should have a length corresponding to the maximum transmission delay time in order to delete inter-symbol interference (ISI). In an exemplary embodiment of the present invention, the length of the CP is variable according to the number of transmissions. The reason why the length of the CP should be variable according to the number of transmissions will be described with reference to FIGS. 5A to 5C.

Figure 5A:
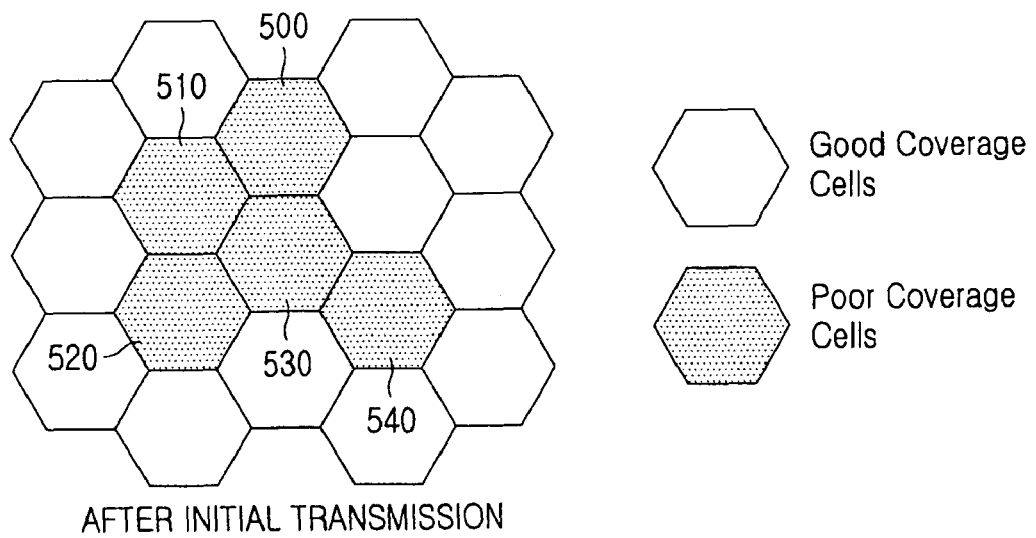
FIGS. 5A to 5C are diagrams illustrating cell distribution based on transmission success rate when broadcast service is provided in a synchronous fashion in cell coverage of each base station in a mobile communication system according to an exemplary embodiment of the present invention.
Figure 5B:
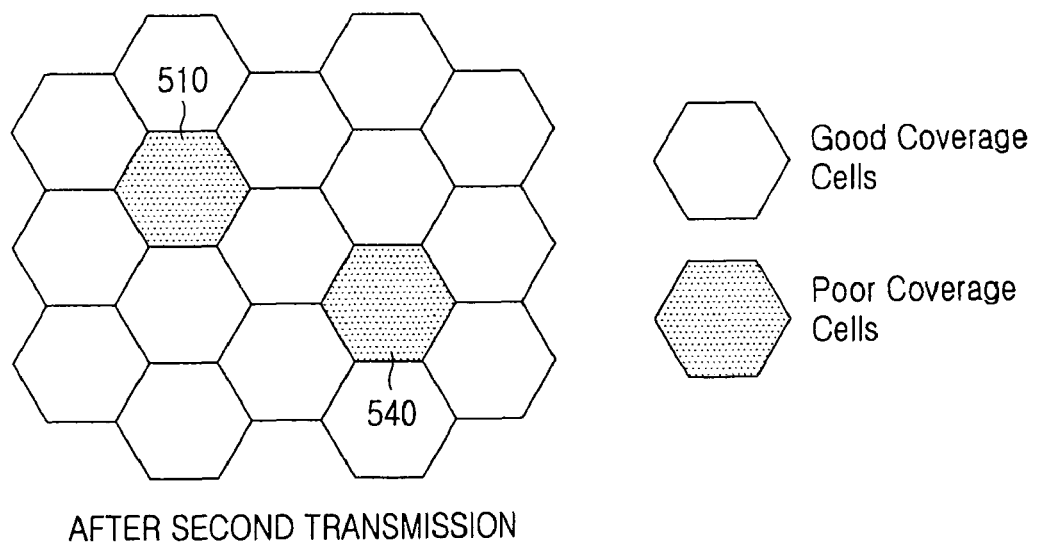
Figure 5C:
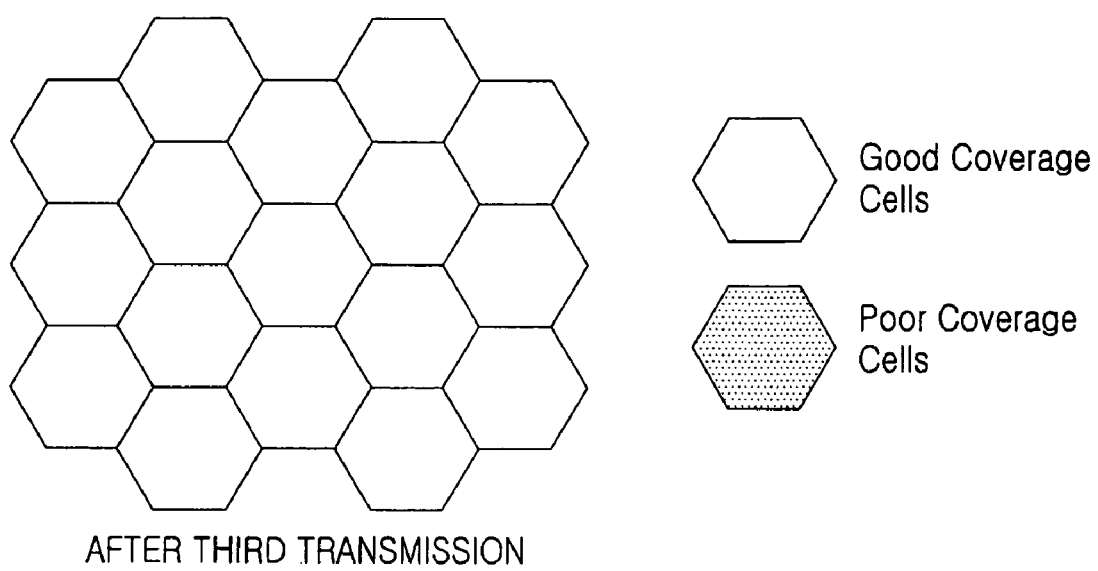

FIGS. 5A to 5C are diagrams illustrating cell distribution based on transmission success rate when broadcast service is provided in a synchronous fashion in cell coverage of each base station in a mobile communication system according to an exemplary embodiment of the present invention.

In FIGS. 5A to 5C, each hexagonal cell represents coverage of one base station, or coverage of one sector. For convenience, it will be assumed herein that one hexagonal cell represents coverage of one base station. In this case, if initial transmission is performed, there is a plurality of cells 500, 510, 520, 530 and 540 having a poor BCMCS reception capability as shown in FIG. 5A. Because there is a plurality of cells having the poor BCMCS reception capability, only the cells with the poor reception capability and their neighbor cells transmit again the same data at the next 4th slot according to the 4-slot interlacing scheme, or retransmit the same data using another interlacing scheme. As a result, the number of cells 510 and 540 with the poor BCMCS reception capability noticeably decreases as shown in FIG. 5B. This is because mobile stations can increase decoding success rates by IR-combining the data received over two times.

If only the cells with the poor reception capability and their neighbor cells perform third transmission in the next 4th slot according to the 4-slot interlacing scheme, there is no cell with the poor reception capability as shown in FIG. 5C. If the retransmissions are performed in this manner, the number of base stations that should provide BCMCS at the time after the initial transmission decreases. As a result, from the second transmission, the ISI can be reduced even though the length of the CP is reduced. Therefore, from the second transmission, the cells can increase the reception success rate even though they transmit the data in a format different from that used for initial transmission, making it possible to freely vary a length of the CP.

Figure 6:
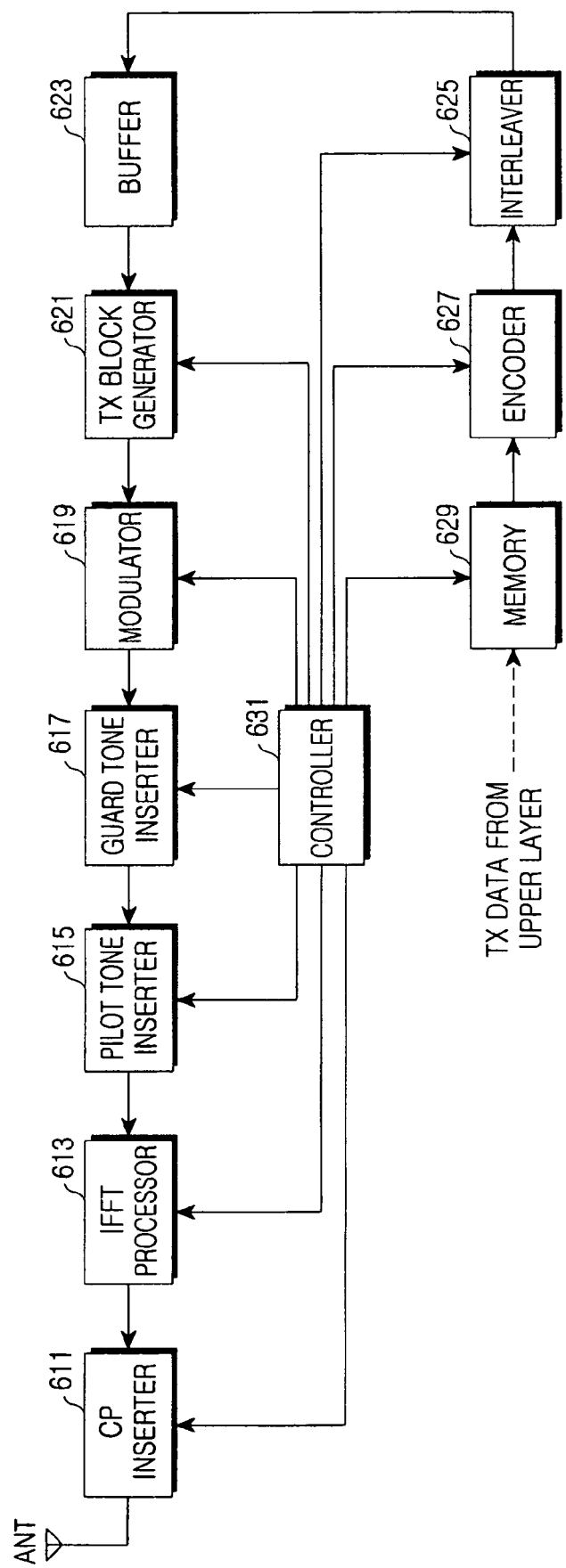
FIG. 6 is a block diagram illustrating a structure of a base station's transmitter for transmitting BCMCS traffic according to an exemplary embodiment of the present invention.

FIG. 6 is a block diagram illustrating a structure of a base station's transmitter for transmitting BCMCS traffic according to an exemplary embodiment of the present invention. The transmitter of FIG. 6 includes a transmission unit for generating an OFDM symbol using a broadcast physical layer packet, in other words broadcast traffic, according to an EBCMC transmission format proposed in an exemplary embodiment of the present invention, a radio frequency (RF) unit for frequency-up-converting the broadcast traffic based on the EBCMC transmission format into an RF signal for a slot interval before transmission, and a controller for controlling generation of the OFDM symbol based on the EBCMC transmission format and controlling operations of the transmission unit and the RF unit such that during initial transmission and retransmission operations, the broadcast traffics are transmitted for the corresponding slot intervals.

A controller 631 controls the overall operation of the base station. In particular, according to an exemplary embodiment of the present invention, the controller 631 receives a format index and a packet size based on the number of transmissions and information on the maximum number of transmission slots from an upper node (not shown) or a scheduler (also not shown) during BCMCS traffic transmission. The controller 631 controls each of the blocks shown in FIG. 6 based on the received information. That is, the controller 631 controls a coding rate of an encoder 627, controls an interleaving process of an interleaver 625 and a transmission block size of a transmission block generator 621, controls a modulation of a modulator 619, controls a guard tone to be inserted by a guard tone inserter 617, controls pilot tone insertion performed in a pilot tone inserter 615, controls inverse fast Fourier transform (IFFT) performed in an IFFT processor 613, and controls CP insertion performed in a CP inserter 611.

In FIG. 6, a memory 629 can generally have a queue as an area for temporarily storing the transmission data received from an upper layer, or can be implemented in the form of a buffer. The memory 629 has areas for storing data of their associated services, and performs a function of temporarily storing transmission data until a transmission time arrives by a scheduler (not shown). If the transmission time arrives by the scheduler, the data stored in the memory 629 for each individual service or individual user is output to the encoder 627 according to a control signal output from the controller 631.

The encoder 627 channel-encodes the data received from the memory 629 under the control of the controller 631. The typical channel encoding apparatus includes a turbo encoder, and can vary a coding rate according to a packet size. The signal output from the encoder 627 is input to the interleaver 625. The interleaver 625 interleaves the coded symbols according to packet size information received from the controller 631. The interleaving is a process of permuting the coded symbols in order to prevent a burst error of the channel. The interleaved symbols are temporarily stored in the memory 623 on a packet-by-packet basis. The transmission block generator 621 generates transmission blocks by extracting the packets temporarily stored in the memory 623 bit by bit at a transmission time, in other words at the current transmission slot. The transmission blocks extracted by the transmission block generator 621 are input to the modulator 619. The modulator 619 modulates the input coded bits according to the modulation order information received from the controller 631.

The bits modulated by the modulator 619 are input to the guard tone inserter 617. The guard tone inserter 617, under the control of the controller 631, acquires the number and positions of the guard tones to be inserted, inserts the guard tones between the modulation symbols, and outputs the guard tone-inserted symbols to the pilot tone inserter 615. The pilot tone inserter 615 receives the number and positions of pilot tones, a PDR, and dual PDR setting information from the controller 613, inserts the transmission pilot tones at the PDR, and outputs the pilot tone-inserted symbols to the IFFT processor 613. The pilot tone inserter 615 can change the PDR according to an EBCMC transmission format or a transmission slot number. The IFFT processor 613 performs IFFT according to an FFT size value received from the controller 631. The IFFT-processed symbols are input to the CP inserter 611. The CP inserter 611 generates an OFDM symbol by copying the CP, a length of which is differently set according to the number of transmissions by the controller 631.

The generated OFDM symbols are up-converted (not shown) to a transmission band, and then transmitted over a radio channel via an antenna ANT.

Figure 7:
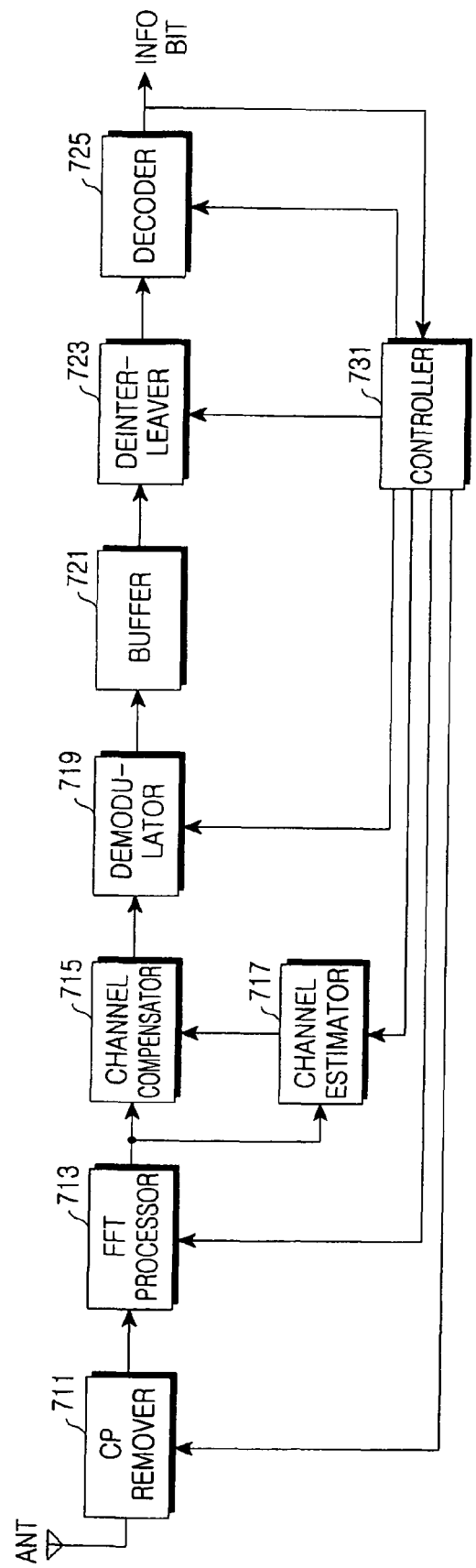
FIG. 7 is a block diagram illustrating an internal structure of a receiver for receiving an OFDM symbol according to an exemplary embodiment of the present invention.

FIG. 7 is a block diagram illustrating an internal structure of a receiver for receiving an OFDM symbol according to an exemplary embodiment of the present invention. The receiver of FIG. 7 includes an undepicted RF unit for frequency-downconverting received broadcast traffic, in other words a broadcast physical layer packet, a reception unit for receiving the broadcast physical layer packet according to a transmission format of the corresponding slot thereby restoring the received packet to its original signal, and a controller for controlling operations of the RF unit and the reception unit such that during initial transmission and retransmission operations, the broadcast physical layer packets are received according to the corresponding slot intervals.

In FIG. 7, a controller 731 controls the overall operation of the receiver, and in particular, performs an operation necessary for receiving OFDM symbols according to an exemplary embodiment of the present invention. Because the OFDM symbols according to an exemplary embodiment of the present invention use the 4-slot interlacing scheme for the HRPD system, the controller 731 receives the OFDM symbols at intervals of 4 slots, and extracts 4 OFDM symbols at one slot as described in connection with FIG. 4. In addition, because the length of the CP in the OFDM symbol can be differently set according to the number of transmissions, the controller 731 determines the CP length from the broadcast overhead message and performs a control operation for restoring the data according to the CP length. That is, when a particular BCMCS is received in a particular format, the controller 731 controls the other constituent elements so that an OFDM signal received depending on a format index, a packet size and the maximum number of transmission slots is received as an OFDM symbol corresponding to the BCMC transmission format.

A CP remover 711 removes a CP contaminated by ISI from the received OFDM symbol based on the information received from the controller 731. The CP-removed OFDM symbol is input to a fast Fourier transform (FFT) processor 713. The FFT processor 713 performs an inverse process of the IFFT according to FFT size information received from the controller 731. The FFT-processed signal is branched into two paths as shown in FIG. 7, and input to a channel estimator 717 and a channel compensator 715. The channel estimator 717 extracts a pilot tone from the FFT-processed OFDM symbol and generates a channel estimation value for compensation of a traffic symbol. For the channel estimation, the channel estimator 717 receives the number and positions of pilot tones, the number and positions of guard tones, and a PDR value from the controller 731. The channel compensator 715 performs channel compensation on the traffic symbols received from the FFT processor 713 using the channel estimation value received from the channel estimator 717.

The channel-compensated symbols are input to a demodulator 719. The demodulator 719 demodulates the signal modulated in the transmitter according to the information on a modulation order acquired from the controller 731, and inputs the demodulated signal to a buffer 721. The buffer 721 stores Log likely hood (LLR) values of the demodulated signal. When the data is transmitted through multiple slots as described in an exemplary embodiment of the present invention, the buffer 721 stores the data transmitted through a plurality of sub-packets. Therefore, if decoding of one packet is completed, all values stored in the buffer 721 should be reset to '0'. After a particular slot is received, the data stored in the buffer 721 is output to a deinterleaver 723. The deinterleaver 723, a channel deinterleaver, performs deinterleaving according to a unique number of the currently transmitted slot and a unit number of a block, received from the controller 731. The deinterleaving is a process of performing an inverse process of the interleaving performed in the transmitter during transmission. That is, the deinterleaving is a process of inversely permuting the permuted bits. The signals deinterleaved in the deinterleaver 723 are input to a decoder 725. The decoder 725 decodes the deinterleaved signals and outputs information bits. In this case, for the unicast data, the decoder 725 outputs a decoding error result to the controller 731, because the controller 731 should receive the decoding error result in order to request retransmission. Even for the BCMCS, the decoder 725 can transmit the decoding error result so that the controller 731 may perform an error correction operation.

A description will now be made of an operation performed in each of the elements during transmission of BCMCS according to an exemplary embodiment of the present invention.

Figure 8:
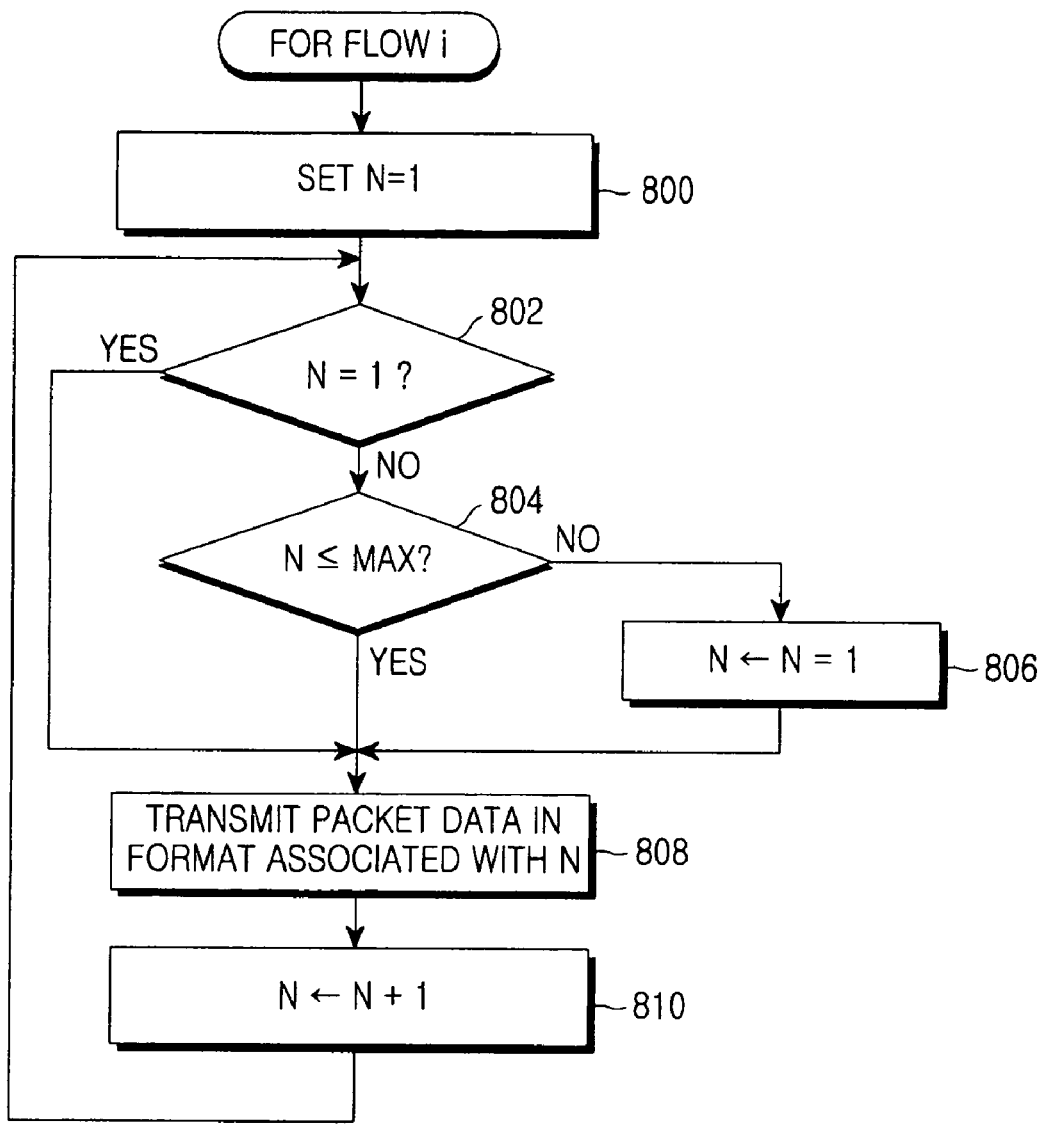
FIG. 8 is a flowchart illustrating a process of transmitting broadcast service traffic in a base station according to an exemplary embodiment of the present invention.

FIG. 8 is a flowchart illustrating a process of transmitting broadcast service traffic in a base station according to an exemplary embodiment of the present invention.

Before a description of FIG. 8 is given, it should be noted that the exemplary process of FIG. 8 is performed for traffic of each broadcast service. In addition, it is assumed that the base station receives broadcast service traffic from an upper layer and broadcasts the received broadcast service traffic to mobile stations. In step 800, the base station sets a value N indicating a unique number of the current transmission packet, in other words the number of transmissions, to '1' for a corresponding broadcast service. Thereafter, in step 802, the base station determines whether N=1. After initially setting the value N, the base station may skip step 802. For convenience, however, it will be assumed herein that the base station performs step 802. If it is determined in step 802 that N=1, the base station proceeds to step 808. Otherwise, the base station proceeds to step 804. In step 808, the base station generates an OFDM symbol using packet data in a format associated with the value N, and transmits the OFDM symbol for one slot. This control operation will be described in detail hereinbelow with reference to the accompanying tables. After transmitting the packet data in this way, the base station increases the value N by 1 in step 810, and returns to step 802.

In step 804, the base station determines whether the value N is less than or equal to a maximum value. The maximum value indicates a maximum number of transmissions. For example, if the maximum number of transmissions is 3, the maximum value is 3. If the value N is greater than the maximum value, indicating that the base station increased the value N by 1 in step 810 after the value N reached the maximum number of transmissions, then the base station sets the value N to '1' in step 806, and then proceeds to step 808. However, if the value N is not greater than the value maximum value, the base station transmits packet data in a format associated with the corresponding number N of transmissions in step 808. For example, the base station performs initial transmission on the OFDM symbol for N=1, performs first retransmission for N=2, and performs second retransmission for N=3.

A broadcast overhead message transmitted by the base station is not shown in FIG. 8. For the overhead, the base station generates and transmits the broadcast overhead message at certain intervals. The broadcast overhead message, as described above, includes information on the configuration format of the OFDM symbol. The format information can be defined as a length of a CP, the number of valid chips, the number of pilot tones, the number of guard tones, a PDR, a dual PDR setting value, a modulation order, and the like.

Figure 9:
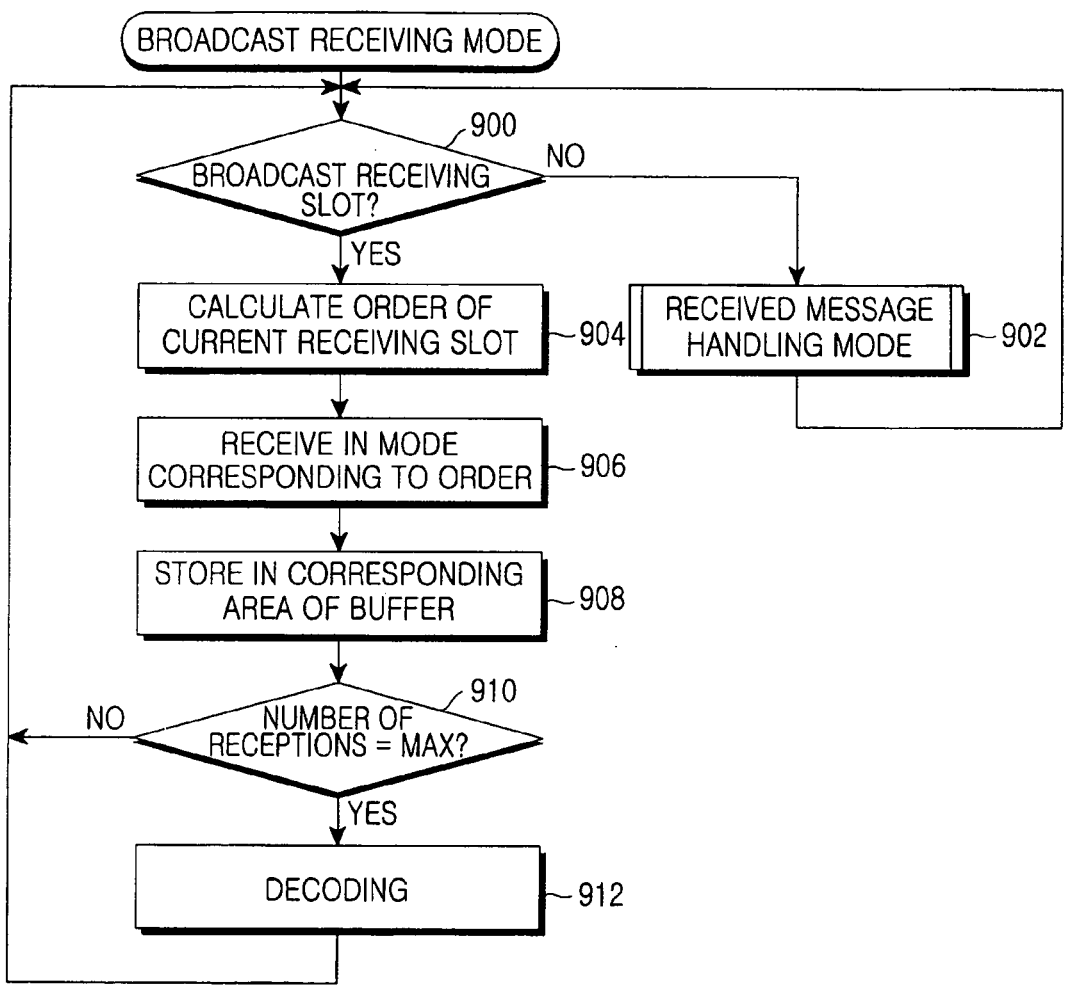
FIG. 9 is a flowchart illustrating a process of receiving broadcast service traffic in a mobile station according to an exemplary embodiment of the present invention.

FIG. 9 is a flowchart illustrating a process of receiving broadcast service traffic in a mobile station according to an exemplary embodiment of the present invention.

Before a description of FIG. 9 is given, the prerequisites in the mobile station will be described. A user of the mobile station should desire to receive a broadcast service, and the mobile station should have received a broadcast overhead message periodically transmitted from a base station and acquired information on the desired broadcast traffic. In addition, the mobile station has already passed the authentication and registration processes, if necessary to receive the initial broadcast service. Through this process, the mobile station extracts information on the desired broadcast service from the received broadcast overhead message. The extracted information includes a BCMC flow ID for the broadcast service desired by the user, a transfer rate of the channel over which the desired broadcast service is transmitted, information on the physical channel constituting a logical channel over which the broadcast service is transmitted, a format index, and the number of broadcast transmission slots. Based on the format index, the mobile station can be aware of an OFDM symbol configuration and a modulation order, defined between the mobile station and the base station. Thereafter, the mobile station checks the broadcast overhead message every slot.

A description will now be made of an operation of the mobile station according to an exemplary embodiment of the present invention in the state where the prerequisites are satisfied. In step 900, the mobile station determines whether the current slot is a slot for receiving desired broadcast service. If the current slot is a slot for receiving the desired broadcast signals, the mobile station proceeds to step 904. Otherwise, the mobile station proceeds to step 902 where it performs an operation of handling a received message.

The received message handling mode includes the process of receiving the broadcast overhead message. In step 904, the mobile station calculates the order of the current reception slot, in other words determines the number of transmissions for the current reception slot. After calculating the number of transmissions for the current reception slot, the mobile station receives OFDM symbols according to a format of the current slot in step 906. For example, if the number of transmissions for the currently received slot is M, the mobile station interprets the received signal as an OFDM symbol in the format associated with Mth reception, performing a reception process. Then the mobile station performs channel estimation using a PDR mapped to the Mth reception format. Thereafter, the mobile station performs demodulation according to a modulation order mapped to the Mth reception format. In step 908, the mobile station stores the received data in an area of a buffer 721 shown in FIG. 7. The mobile station stores the demodulated symbol in the area corresponding to an Mth slot for the current packet in the buffer 721. Thereafter, in step 910, the mobile station determines whether the number of receptions has reached the maximum number of transmissions, as determined in the system. If it is determined that the number of receptions has reached the maximum number of transmissions, the mobile station decodes the data stored in the buffer 721 in step 912. However, if the number of receptions has not reached the maximum number of transmissions, the mobile station waits until the number of receptions reaches the maximum number of transmissions. It should be noted that the mobile station, depending on its structure, may attempt the decoding even before the number of receptions reaches the maximum value. If the mobile station fails in decoding, it receives sub-packets in the next broadcast transmission slot and then stores the received sub-packets in the corresponding area of the buffer 721. Thereafter, the mobile station may reattempt the decoding.

A detailed description will now be made of a method for transmitting broadcast data in a different OFDM format according to the number of transmissions according to an exemplary embodiment of the present invention.

Herein, a detailed description will be made of a method for defining a signal transmission format in the system using a plurality of the OFDM signal transmission formats. The constituent elements of the transmission format according to an exemplary embodiment of the present invention, as described above, can include a modulator order and a PDR value. The PDR value can be set depending on whether each of 4 OFDM symbols transmitted in one slot is an internal symbol (for example, 2nd and 3rd symbols in FIG. 4) or a boundary symbol (for examples, 1st and 4th symbols in FIG. 4).

Generally, a Single Frequency Network (SFN)-based OFDM broadcast system (including a broadcast system based on a communication system) sets a length of a CP of an OFDM symbol relatively long in order to obtain an SFN gain. As described above, the CP is a signal attached to the head of an OFDM symbol, and the CP interval is a signal interval provided for suppressing the ISI which may occur when a receiver receives multi-path signals. An OFDM symbol that arrives after being delayed for a time longer than the CP interval on the basis of the signal first received at the receiver causes ISI in the receiver, reducing reception capability. Therefore, the SFN communication system with a long propagation delay sets the guard interval, in other words the CP, relatively long so as to suppress interference and make strength of the signal high enough, if possible. This is applied even to the BCMCS provided in the CDMA2000 HRPD system. In the CDMA2000 HRPD system, cells in a particular area transmit the same broadcast signals, and the receiver preferably combines as many received signals as possible to reduce interference and improve reception quality. Therefore, the system sets the CP interval of the OFDM symbol long as described above.

However, because a cell located in a boundary with another broadcast area, or a cell located in shadow area decreases in reception rate with the single transmission, it retransmits a BCMC packet using a unicast slot in order to compensate for the decrease in the reception rate. Generally, the retransmission is performed only in the area with the poor reception environment. The decrease in the cell area where the same signals are transmitted reduces a delay time of the signals arriving at the receiver, making it unnecessary to set the CP interval of the OFDM symbol long. That is, it is not possible to obtain the SFN gain at the retransmission time. If retransmission may occur in a particular cell two times or more, the signal delay time may decrease because the increase in the number of retransmissions decreases the number of the cells where the retransmission occurs. That is, as described above, if the retransmissions continuously occur as described in connection with FIGS. 5A to 5C, the number of the cells where the retransmissions are performed decreases each time the retransmission occurs.

Taking into account the fact that the broadcast reception characteristic changes during retransmission, it is possible to change a format of the OFDM signal according to a reception environment during the retransmission. That is, it is possible to increase a ratio of data symbols by reducing a length of the CP interval during the retransmission, contributing to a decrease in the coding rate and improvement in the reception capability.

Table 1 below shows a possible exemplary format of a transmission OFDM symbol.

TABLE 1

|  | Symbol Configuration 0 | Symbol Configuration 1 | Symbol Configuration 2 |
| --- | --- | --- | --- |
| Guard interval (CP) (chip) | 80 | 40 | 16 |
| Valid data (chip) | 320 | 360 | 384 |
| Number of pilot tones | 64 | 36 | 24 |
| Number of guard tones | 20 | 0 | 0 |

It would be obvious to those skilled in the art that the transmission format is subject to change. In Table 1, a format with a longer length of the CP permits a longer multi-path delay. The use of the format with the long length of the CP obtains a higher SFN gain. On the contrary, the use of a format with a short length of the CP contributes to an increase in data throughput. The terms used in Table 1 will be defined hereinbelow.

(1) CP interval (or Guard interval): It indicates the number of chips available in a CP interval in one OFDM symbol inserted into a ½ slot in an HRPD system.

(2) Valid data: It indicates the number of chips available for data transmission except for the guard interval, in other words the CP interval, in one OFDM symbol inserted into a ½ slot in the HRPD system.

(3) Number of pilot tones: It indicates the number of pilot tones inserted in a valid data interval in one OFDM symbol inserted into a ½ slot in the HRPD system.

(4) Number of Guard tones: It indicates the number of guard tones inserted in a valid data interval in one OFDM symbol inserted into a ½ slot in the HRPD system.

Figure 10:
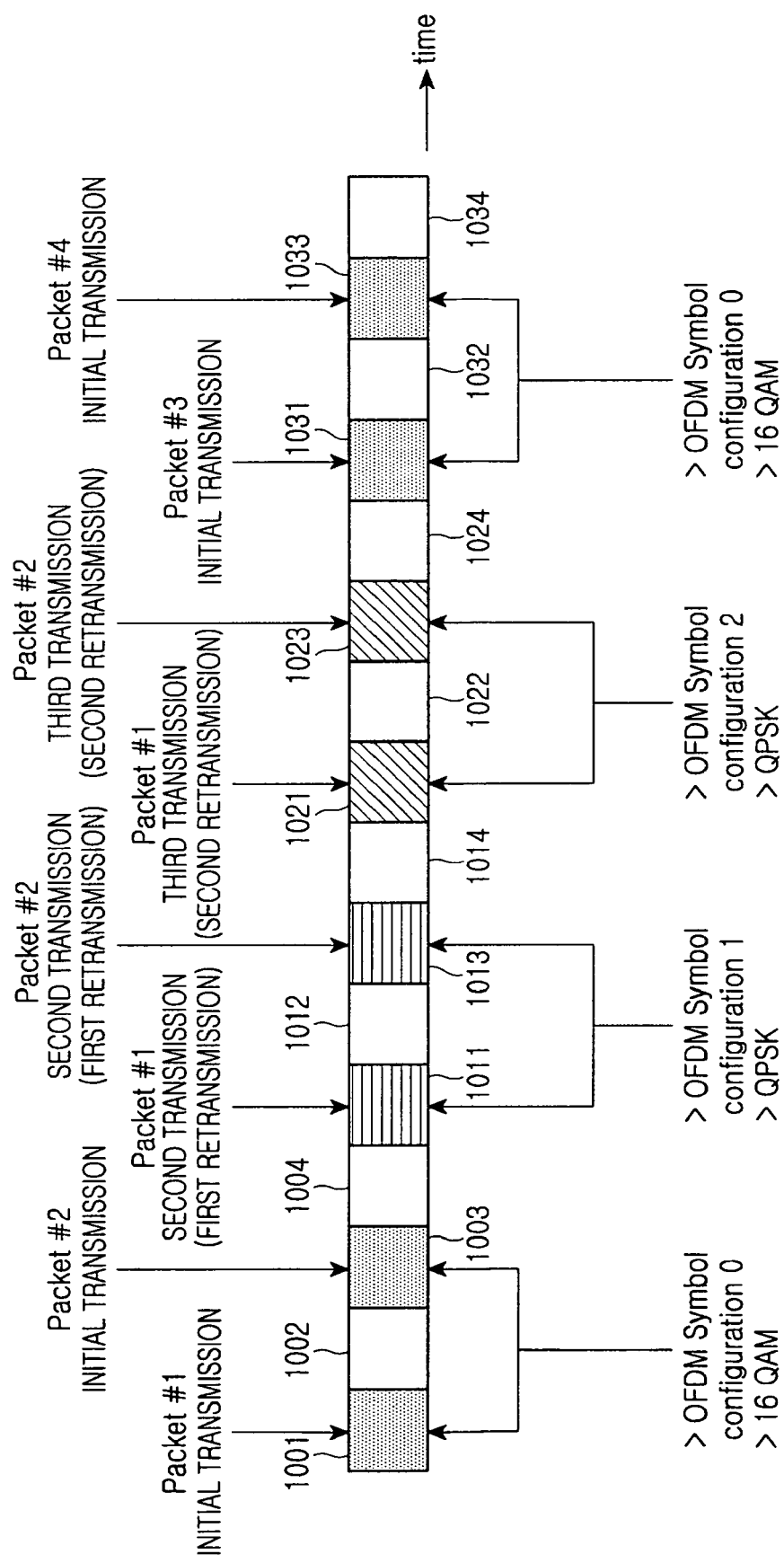
FIG. 10 is a timing diagram illustrating a scenario in which two retransmissions are performed in a 4-slot interlacing scheme according to another exemplary embodiment of the present invention.

FIG. 10 is a timing diagram illustrating a scenario in which two retransmissions are performed in a 4-slot interlacing scheme according to another exemplary embodiment of the present invention. In the scenario of FIG. 10, Packet #1, Packet #2, Packet #3 and Packet #4 constituting one encoder packet are retransmitted two times, and no transmission is performed in an adjacent time slot. It can be noted that time slots 1001 and 1003 where the Packet #1 and Packet #2 are transmitted, and time slots 1002 and 1004 where unicast transmission is performed adopt the 4-slot interlacing scheme. Therefore, at initial transmission of the Packet #1 and Packet #2, an OFDM symbol of a symbol configuration-0 type is 16QAM-modulated before being transmitted, and in time slots 1011 and 1013 for second transmission, in other words first retransmission, slots 1012 and 1014 where unicast transmission is performed even for second transmission are transmitted in the same method. At the last third transmission, in other words second retransmission, an OFDM symbol of a symbol configuration-1 type is QPSK-modulated before being transmitted, unlike in the initial transmission. After the 3 transmissions are all completed using the symbol configuration and modulation methods corresponding to the order of the transmission slots, the next packet is transmitted. That is, the intervals where initial transmissions of the Packet #3 and Packet #4 are performed are represented by reference numerals 1031 and 1033.

In the exemplary scenario of FIG. 10, the method of transmitting one packet by a base station includes the following elements:

(1) Encoder packet size
(2) Span (or Number of transmission slots)
(3) per-slot OFDM symbol configuration (or OFDM symbol configuration per transmission slot)
(4) per-slot Modulation order (or Modulation order per transmission slot)
(5) per-PDR (or PDR per transmission slot)

In order to simply represent this packet transmission scheme, the per-slot OFDM symbol configuration and the per-slot modulation order among the above elements will be represented in one format. When only 3 types of symbol configurations and 2 types of modulation orders are taken into consideration, a total of 6 combinations are possible as shown in Table 2 below, and the 6 possible combinations are named as Format A to Format F, respectively. The number of the possible configurations is extensible according to the number of symbol configurations and the number of modulation orders.

TABLE 2

| Combination of OFDM symbol configuration and Modulation order | Format name |
|---|---|
| Symbol Configuration 0, 16QAM | A |
| Symbol Configuration 1, 16QAM | B |
| Symbol Configuration 2, 16QAM | C |
| Symbol Configuration 0, QPSK | D |
| Symbol Configuration 1, QPSK | E |
| Symbol Configuration 2, QPSK | F |

In order to effectively apply an exemplary embodiment of the present invention, the base station needs to previously define the appropriate number of slots, and transmission formats for the individual slots (per-slot transmission formats) according to the environments, and provide information on the number of slots and the per-slot transmission formats to the mobile station using an appropriate method. Alternatively, the mobile station may previously have the information on the number of slots and the per-slot transmission formats. It will be assumed herein that an agreement between the mobile station and the base station is made such that the number of slots and the per-slot transmission formats are represented by format index values.

When a combination of an OFDM symbol configuration and a modulation order is defined as one format as shown in Table 2, there are various possible transmission methods (span and transmission formats) defined in Table 3 below. Although there are various possible transmission format combinations, the transmission format combinations of Table 3 satisfy the following two conditions:

(A) An increase in the number of transmissions maintains or decreases the modulation order.

(B) An increase in the number of transmissions maintains or increases the number of valid data chips.

The above two conditions are the results that can be obtained by taking into account the fact that the increase in the number of retransmissions decreases the number of areas where the BCMC signals are transmitted.

Table 3 below shows which transmission format the system that performs 3 transmissions will use for each individual slot. Each case can be represented with a number indicating a format index. For example, a format index value '1' indicates that three slots are transmitted in a transmission format A, a transmission format B, and a transmission format C, respectively.

TABLE 3

| Format index | Modulation order | Initial transmission | First retransmission | Second retransmission |
|---|---|---|---|---|
| 0 | initial transmission: | A | A | A |
| 1 | 16QAM | A | A | B |
| 2 | first retransmission: | A | A | C |
| 3 | 16QAM | A | B | B |
| 4 | second retransmission: | A | B | C |
| 5 | 16QAM | A | C | C |
| 6 | | B | B | B |
| 7 | | B | B | C |
| 8 | | B | C | C |
| 9 | | C | C | C |
| 10 | initial transmission: | A | A | D |
| 11 | 16QAM | A | A | E |
| 12 | first retransmission: | A | A | F |
| 13 | 16QAM | A | B | E |
| 14 | second retransmission: | A | B | F |
| 15 | QPSK | A | C | F |
| 16 | | B | B | E |
| 17 | | B | B | F |

TABLE 3-continued

| Format index | Modulation order | Initial transmission | First retransmission | Second retransmission |
|---|---|---|---|---|
| 18 | | B | C | F |
| 19 | | C | C | F |
| 20 | initial transmission: | A | D | D |
| 21 | 16QAM | A | D | E |
| 22 | first retransmission: | A | D | F |
| 23 | QPSK | B | E | E |
| 24 | second retransmission: | B | E | F |
| 25 | QPSK | B | F | F |
| 26 | | C | F | F |

When the per-slot transmission formats are defined as shown in Table 3, the base station can provide information indicating a broadcast type and a transmission format used in the corresponding area to the mobile station simply with the format index using, for example, a broadcast overhead message. For the case where less then three slots are transmitted, the base station needs to provide the mobile station with the span and the format index together. Alternatively, it is also possible to bind these two parameters, in other words the span and the format index, into one parameter, and express the one parameter as an EBCMC transmission format.

As an exemplary alternative method, the base station may provide only the format index to the mobile station. That is, even though the base station does not provide the span (in other words the total number of transmission slots), the mobile station can perform decoding by attempting the decoding taking all possible cases into account. The base station can provide only the format index, and spontaneously determine the actual span. If the actual span is less than the span determined through the format index, the base station may transmit unicast packets for the remaining slots.

A possible format of the broadcast overhead message for the use of the above method is shown in Table 4.

TABLE 4

| Field | Length(bits) |
|---|---|
| [...] | [...] |
| NeighborCount | 5 |
| [...] | [...] |
| NumExtendedSlotIncluded | 1 |
| [...] | [...] |
| BCMCSFlowCount | N |
| BCMCSFlowCount occurrence of the following variable length record:{ | |
| BCMCSFlowID | 4 |
| [...] | [...] |
| NumExtendedSlot | 0 or 2 |
| FormatIndex | 0 or 5 |
| [...] | [...] |
| Zero or NeighborCount occurrences of the following fields | |
| [...] | [...] |
| NumExtendedSlot | 0 or 2 |
| FormatIndex | 0 or 5 |
| [...] | [...] |
| } | |
| [...] | [...] |

The message of Table 4 indicates whether to additionally transmit a packet for each individual BCMCS flow, and in this case, it is possible to provide a per-slot transmission format using an OFDM format index. In addition, in order to provide transmission information in a neighbor cell, the message indicates whether to additionally transmit a packet in the neighbor cell in the same way, and in this case, it provides the per-slot transmission format using a FormatIndex field. The fields in Table 4 are used for the following purposes.

(1) NeighborCount: It indicates the number of neighbor cells, containing broadcast transmission information included in this message.

(2) NumExtendedSlotIncluded: It is an indicator indicating whether there are any included fields indicating additional transmission in addition to the determined transmission slot and transmission method. While the determined transmission slot and transmission method are applied in the same way to all neighbor cells included in this message, the information included by this indicator can be different for each cell.

(3) BCMCSFlowCount: It indicates the number of BCMCS flows included in this message.

(4) BCMCSFlowID: It is an identifier of a corresponding broadcast service.

(5) NumExtendedSlot: It indicates the number of slots which are additionally transmitted packet by packet, and this field is included only when "NumExtendedSlotIncluded" is '1' in Table 4.

(6) FormatIndex: It indicates a transmission format used for transmission. This field is included only when NumExtendedSlotIncluded='1' and NumExtendedSlot='0' in Table 4.

Table 3 above shows possible combinations of transmission formats according to an exemplary embodiment of the present invention. In the actual mobile communication system, it is possible to selectively use only some of the transmission formats shown in Table 3 in order to simplify the system design and verification.

Table 5 to Table 8 below show possible exemplary combinations in the case where only some of all possible combinations are selectively used. That is, embodiments of Table 5 to Table 8 define different OFDM symbol formats/per-slot modulation orders for individual packet sizes/transmission slots, and regard all of the OFDM symbol formats/per-slot modulation orders as one transmission format combination. This transmission format combination will be defined as a mode. That is, the base station/mobile station uses the transmission/reception packet size, the OFDM symbol corresponding to the slot, and the modulation order, for transmission (by base station)/reception (by base station).

TABLE 5

| Packet Size | Tx1 OFDM | Tx2 OFDM | Tx3 OFDM | Tx4 OFDM | Tx1 Modulation | Tx2 Modulation | Tx3 Modulation | Tx4 Modulation |
|---|---|---|---|---|---|---|---|---|
| 2048 | 320 tone | 320 tone | 320 tone | — | 16QAM | 16QAM | 16QAM | — |
| 3072 | 320 tone | 320 tone | 320 tone | — | 16QAM | 16QAM | 16QAM | — |
| 5120 | 320 tone | 320 tone | 320 tone | 320 tone | 16QAM | 16QAM | 16QAM | 16QAM |
| 3072 | 360 tone | 360 tone | 360 tone | — | 16QAM | 16QAM | 16QAM | — |
| 4096 | 360 tone | 360 tone | 360 tone | — | 16QAM | 16QAM | 16QAM | — |

Table 5 above shows an exemplary transmission format for a default mode or fixed mode. In Table 5, for the packet sizes of 2048, 3072, 4096, and 5120, initial transmission and its succeeding transmissions have the same modulation order (or modulation scheme) and the same OFDM format. Transmission for the mode specified in Table 5 is configured based on the conventional technology to which the present invention is not applied.

TABLE 6

| Packet Size | Tx1 OFDM | Tx2 OFDM | Tx3 OFDM | Tx4 OFDM | Tx1 Modulation | Tx2 Modulation | Tx3 Modulation | Tx4 Modulation |
|---|---|---|---|---|---|---|---|---|
| 2048 | 320 tone | 360 tone | 360 tone | — | 16QAM | QPSK | QPSK | — |
| 3072 | 320 tone | 360 tone | 360 tone | — | 16QAM | QPSK | QPSK | — |
| 5120 | 320 tone | 320 tone | 360 tone | 360 tone | 16QAM | 16QAM | QPSK | QPSK |
| 3072 | 360 tone | 384 tone | 384 tone | — | 16QAM | QPSK | QPSK | — |
| 4096 | 360 tone | 384 tone | 384 tone | — | 16QAM | QPSK | QPSK | — |

Table 6 above shows a transmission format of a zone-based mode configured according to an exemplary embodiment of the present invention. The transmission format of Table 6 is determined based on the following criteria.

(1) The modulation order and the OFDM format associated with a transmission format are used for the transmissions until a channel coding rate$\leq 1$.

(2) The OFDM format changes step by step from the transmission after the channel coding rate<1. For example, the OFDM format changes from 320 tones to 360 tones, and from 360 tones to 384 tones step by step.

(3) When the OFDM format changes as stated in (2), 16QAM also changes to QPSK.

TABLE 7

| Packet Size | Tx1 OFDM | Tx2 OFDM | Tx3 OFDM | Tx4 OFDM | Tx1 Modulation | Tx2 Modulation | Tx3 Modulation | Tx4 Modulation |
|---|---|---|---|---|---|---|---|---|
| 2048 | 320 tone | 360 tone | 360 tone | — | 16QAM | QPSK | QPSK | — |
| 3072 | 320 tone | 360 tone | 360 tone | — | 16QAM | QPSK | QPSK | — |
| 5120 | 320 tone | 320 tone | 320 tone | 360 tone | 16QAM | 16QAM | 16QAM | QPSK |
| 3072 | 360 tone | 384 tone | 384 tone | — | 16QAM | QPSK | QPSK | — |
| 4096 | 360 tone | 360 tone | 384 tone | — | 16QAM | 16QAM | QPSK | — |

Table 7 above shows another transmission format of a zone-based mode configured according to an exemplary embodiment of the present invention. The transmission format of Table 7 is determined based on the following criteria.

(1) On the assumption that one transmission is performed in a 1.6667 ms transmission interval, a transmission format associated with a predetermined mode is used at a data rate higher than a reference rate of 1 Mbps. The OFDM format changes step by step as described in Table 6, at a data rate lower than the reference rate.

(2) When the OFDM format changes as stated in (1), 16QAM also changes to QPSK.

As an exemplary application of the criteria used for determining the transmission format of Table 7, for second transmission for 2048 bits, because a data rate is 614.4 kbps (=2048/(1.6667 ms*2)), the 360-tone OFDM format and QPSK modulation are used from the second transmission. It determines whether to change the transmission format of Table 7 in a mode on the basis of a particular data rate of 1 Mbps. It would be obvious to those skilled in the art that this scheme can be applied in the same way even though another data rate is used.

TABLE 8

| Packet Size | Tx1 OFDM | Tx2 OFDM | Tx3 OFDM | Tx4 OFDM | Tx1 Modulation | Tx2 Modulation | Tx3 Modulation | Tx4 Modulation |
|---|---|---|---|---|---|---|---|---|
| 2048 | 320 tone | 320 tone | 360 tone | — | 16QAM | 16QAM | QPSK | — |
| 3072 | 320 tone | 320 tone | 360 tone | — | 16QAM | 16QAM | QPSK | — |
| 5120 | 320 tone | 320 tone | 320 tone | 360 tone | 16QAM | 16QAM | 16QAM | QPSK |
| 3072 | 360 tone | 360 tone | 384 tone | — | 16QAM | 16QAM | QPSK | — |
| 4096 | 360 tone | 360 tone | 384 tone | — | 16QAM | 16QAM | QPSK | — |

Table 8 above shows an exemplary transmission format of a zone-based mode configured according to another exemplary embodiment of the present invention. The transmission format of Table 8 is determined based on the following criteria.

(1) At the last transmission, the OFDM format always changes step by step. For example, the OFDM format changes from 320 tones to 360 tones, and from 360 tones to 384 tones.

(2) When the OFDM format changes, 16QAM also changes to QPSK.

TABLE 9

| Packet Size | Tx1 OFDM | Tx2 OFDM | Tx3 OFDM | Tx4 OFDM | Tx1 Modulation | Tx2 Modulation | Tx3 Modulation | Tx4 Modulation |
|---|---|---|---|---|---|---|---|---|
| 2048 | 320 tone | 360 tone | 360 tone | — | 16QAM | 16QAM | 16QAM | — |
| 3072 | 320 tone | 360 tone | 360 tone | — | 16QAM | 16QAM | 16QAM | — |
| 5120 | 320 tone | 320 tone | 360 tone | 360 tone | 16QAM | 16QAM | 16QAM | 16QAM |
| 3072 | 360 tone | 384 tone | 384 tone | — | 16QAM | 16QAM | 16QAM | — |
| 4096 | 360 tone | 384 tone | 384 tone | — | 16QAM | 16QAM | 16QAM | — |

Table 9 above shows an exemplary transmission format of a zone-based mode configured according to further another exemplary embodiment of the present invention. The transmission format of Table 9 is determined based on the following criterion.

(1) The modulation order and the OFDM format associated with a transmission format are used for the transmissions until a channel coding rate≦1.

The mobile communication system basically supports the transmission format for the mode, shown in Table 5, and can additionally support one of the transmission formats of the zone-based mode, shown in Table 6 to Table 9. Therefore, each mode can be indexed with a transmission format index as shown in Table 3, and then transmitted from the base station to the mobile station through a signaling message or a broadcast overhead message. In this case, the corresponding field can be named as a mode index. Because the mobile station can directly or indirectly provide size information of the packet the base station will transmit, using a field other than the mode index, the mobile station can determine a slot and an OFDM format to be used for reception, using the mode index and packet size information of the current broadcast service. The reduction in types of the supported transmission formats contributes to simple realization of the mobile communication system's transceiver.

TABLE 10

| EBCMCSTransmissionFormat field | Data Rate (kbps) | Number of Tones for Span1 ($N_{FFT1}$) | Number of Tones for Span2 ($N_{FFT2}$) | Physical Layer Packet Size (bits) | Span1 (slots) | Span2 (slots) |
|---|---|---|---|---|---|---|
| '000000' | 1843.2 | 320 | NA | 3072 | 1 | NA |
| '000001' | 921.6 | 320 | NA | 3072 | 2 | NA |
| '000010' | 614.4 | 320 | NA | 3072 | 3 | NA |
| '000100' | 1228.8 | 320 | NA | 2048 | 1 | NA |
| '000101' | 614.4 | 320 | NA | 2048 | 2 | NA |
| '000110' | 409.6 | 320 | NA | 2048 | 3 | NA |
| '001001' | 1536.0 | 320 | NA | 5120 | 2 | NA |
| '001010' | 1024.0 | 320 | NA | 5120 | 3 | NA |
| '001011' | 768.0 | 320 | NA | 5120 | 4 | NA |
| '001100' | 2457.7 | 360 | NA | 4096 | 1 | NA |
| '001101' | 1228.8 | 360 | NA | 4096 | 2 | NA |
| '001110' | 819.2 | 360 | NA | 4096 | 3 | NA |
| '010000' | 1843.2 | 360 | NA | 3072 | 1 | NA |

TABLE 10-continued

| EBCMCSTransmissionFormat field | Data Rate (kbps) | Number of Tones for Span1 ($N_{FFT1}$) | Number of Tones for Span2 ($N_{FFT2}$) | Physical Layer Packet Size (bits) | Span1 (slots) | Span2 (slots) |
|---|---|---|---|---|---|---|
| '010001' | 921.6 | 360 | NA | 3072 | 2 | NA |
| '010010' | 614.4 | 360 | NA | 3072 | 3 | NA |
| '100001' | 921.6 | 320 | 360 | 3072 | 1 | 1 |
| '100010' | 614.4 | 320 | 360 | 3072 | 1 | 2 |
| '100101' | 614.4 | 320 | 360 | 2048 | 1 | 1 |
| '100110' | 409.6 | 320 | 360 | 2048 | 1 | 2 |
| '101010' | 1024.0 | 320 | 360 | 5120 | 2 | 1 |
| '101011' | 768.0 | 320 | 360 | 5120 | 2 | 2 |
| '101101' | 1228.8 | 360 | 384 | 4096 | 1 | 1 |
| '101110' | 819.2 | 360 | 384 | 4096 | 1 | 2 |
| '110001' | 921.6 | 360 | 384 | 3072 | 1 | 1 |
| '110010' | 614.4 | 360 | 384 | 3072 | 1 | 2 |
| All other settings | | | Reserved | | | |

Table 10 above expresses a combination of the mode index, the encoder packet size, and the span, mentioned in Table 9, as an index EBCMCSTransmissionFormat.

Table 10 shows one mode made by combining the modes presented in Table 5 and Table 9. The most significant bit (MSB) of the EBCMCSTransmissionFormat serves as a mode index. That is, for MSB=0, the transmitter continues transmission without changing the OFDM symbol format, and for MSB=1, the transmitter operates in the mode mentioned in Table 9. In other words, MSB=1 indicates a mode in which the OFDM symbol format changes from a second slot (for Encoder Packet size=2048, 3072, and 4096) or a third slot (for Encoder Packet size=5120).

"Number of Tones for Span 1" indicates the number of OFDM format tones used in the interval where the OFDM symbol format is not changed, and "Number of Tones for Span 2" indicates the number of OFDM format tones used in the interval where the OFDM symbol format is changed. "Physical Layer packet size" indicates a size of an encoder packet. "Span1" and "Span2" indicate the number of slots where the OFDM symbol format is not changed, and the number of slots where the OFDM symbol format is changed, respectively. As shown in Table 9, the format change occurs only once regardless of whether the maximum span is 3 slots or 4 slots.

Next, a description will be made as to how the proposed indexing method can be applied to the broadcast overhead message. A message shown in Table 11 below is configured such that PDRs of 0th and 3rd OFDM blocks can be set different from PDRs of 1st and 2nd OFDM blocks. Table 11 also presents an exemplary method for setting a dual PDR in the case where a variable format is applied.

TABLE 11

| | |
|---|---|
| DualPDREnabled | 1 |
| BCMCSFlowCount | 7 |
| BCMCSFlowCount occurrences of the following variable-length record: | |
| BCMCSFlowID | (BCMCSFlowID Length+1)×8 |
| [...] | |
| LogicalChannelSameAsPreviousBCMCSFlow | 1 |
| Zero or one occurrence of the following nine field record | |
| PhysicalChannelCount | 7 |
| EBCMCSTransmissionFormat | 0 or 6 |
| [...] | |
| DCPilotToDataGain | 0 or 5 |
| DualPDREnabledForThisLogicalChannel | 0 or 1 |
| ACPilotToDataGainRecord | 0, 5, 10, x or y |
| Period | 0 or 3 |
| Zero or PhysicalChannelCount occurrences of the following two fields: | |
| Interlace | 2 |
| Multiplex | 4 |
| AdditionalCDMAChannelsSameAsPreviousBCMCSFlow | 1 |
| AdditionalCDMAChannelCount | 0 or 3 |
| Zero or AdditionalCDMAChannelCount occurrences of the following field | |
| AdditionalCDMAChannel | 24 |

A description will now be made of the fields shown in Table 11.

(1) DualPDREnabled: An access network, in other words a base station or a base station controller, sets this field to '1' if it uses a dual pilot-to-data gain. Otherwise, the access network sets this field to '0'.

(2) BCMCSFlowCount: It indicates the number of BCMCS Flow identifiers included in the message of Table 11 transmitted by the access network.

(3) BCMCSFlowID: It is set by the access network, and is set as a BCMCS Flow identifier of a particular BCMC flow.

(4) LogicalChannelSameAsPreviousBCMCSFlow: If this BCMC Flow is transmitted through the same logical channel as that of the previous BCMC Flow recorded in this message, the access network sets this field to '1'. Otherwise, the access network sets this field to '0'.

(5) PhysicalChannelCount: If the LogicalChannel-SameAsPrevious-BCMCSFlow described in (4) is set to '1', the access network omits this field. Otherwise, this field sets the number of interlace-multiplex pairs constituting a logical channel within the range of 0 to 64.

(6) EBCMCSTransmissionFormat: If the LogicalChannelSameAsPreviousBCMCSFlow described in (4) is set to '1', or if the PhysicalChannelCount described in (5) is set to '0', the access network will omit this field. Otherwise, the access network sets an Enhanced Broadcast transmission format used for transmitting this logical channel in accordance with Table 10 above.

(7) DCPilotToDataGain: If the LogicalChannelSameAsPreviousBCMCSFlow described in (4) is set to '1', or if the PhysicalChannelCount described in (5) is set to '0', this field is omitted. Otherwise, the access network will set this field to a power ratio of a zero frequency's pilot tone to a non-zero frequency's data tone. If this field is set to '10000', this field value is construed as '0' in a linear domain. Otherwise, this field value is construed as a 2's complement in 0.5-dB step size.

(8) DualPDREnabledForThisLogicalChannel: If the DualPDREnabled is set to '0', or if the LogicalChannelSameAsPreviousBCMCSFlow described in (4) is set to '1', or if the PhysicalChannelCount described in (5) is set to '0', then the access network omits this field. Otherwise, the access network sets this field as follows. That is, the access network sets this field to '1', if the dual PDR is used for this logical channel. Otherwise, the access network sets this field to '0'.

(9) ACPilotToDataGainRecord: If the DualPDREnabledForThis-LogicalChannel described in (8) is not included in this message, the access network omits this field. Otherwise, the access network sets this field as follows:

If the DualPDREnabledForThisLogicalChannel is set to '0' and the MSB of the EBCMCSTransmissionFormat described in (6) is set to '0', the access network sets this record as defined in Table 12 below.

If the DualPDREnabledForThisLogicalChannel described in (8) is set to '0' and the MSB of the EBCMCSTransmissionFormat described in (6) is set to '1', the access network sets this record as defined in Table 13 below.

If the DualPDREnabledForThisLogicalChannel described in (8) is set to '1' and the MSB is set to '0', the access network sets this field as defined in Table 14 below.

If the DualPDREnabledForThisLogicalChannel is set to '1' and the MSB of the EBCMCSTransmissionFormat described in (6) is set to '1', the access network sets this record as defined in Table 15 below.

Now, the foregoing conditions will be defined in Table 12 to Table 15, and a description of the fields shown in Table 12 to Table 15 will be made hereinbelow.

TABLE 12

| Sub-Field | Length (bits) |
| --- | --- |
| ACPilotToDataGain | 5 |

In Table 12, the access network sets the ACPilotToDataGain field to a power ratio of a non-zero frequency's pilot tone to a non-zero frequency's data tone. This field can be expressed with a 2's complement in 0.5 dB steps.

TABLE 13

| Sub-Field | Length (bits) |
| --- | --- |
| ACPilotToDataGain1 | 5 |
| ACPilotToDataGain2 | 5 |

In Table 13, the access network sets the ACPilotToDataGain1 field to a power ratio of a non-zero frequency's pilot tone to a non-zero frequency's data tone for a Span1's slot. This field can be expressed with a 2's complement in 0.5 dB steps. In addition, the access network sets the ACPilotToDataGain2 field to a power ratio of a non-zero frequency's pilot tone to a non-zero frequency's data tone for a Span2's slot. This field can be expressed with a 2's complement in 0.5 dB steps.

TABLE 14

| Sub-Field | Length (bits) |
| --- | --- |
| ACInternalPilotToDataGain | x |
| ACBoundaryPilotToDataGain | x |

In Table 14, the access network sets the ACInternalPilotToDataGain field to a power ratio of a non-zero frequency's pilot tone and a non-zero frequency's data tone for each of OFDM block 1 and OFDM block 2. This field can be expressed with a 2's complement in 0.5 dB steps. In addition, the access network sets the ACBoundaryPilotToDataGain field to a power ratio of a non-zero frequency's pilot tone and a non-zero frequency's data tone for each of OFDM block 0 and OFDM block 3. This field can be expressed with a 2's complement in 0.5 dB steps.

TABLE 15

| Sub-Field | Length (bits) |
| --- | --- |
| ACInternalPilotToDataGain1 | x |
| ACBoundaryPilotToDataGain1 | x |
| ACInteraalPilotToDataGain2 | x |
| ACBoundaryPilotToDataGain2 | x |

In Table 15, the access network sets the ACInternalPilotToDataGain1 field to a power ratio of a non-zero frequency's pilot tone to a non-zero frequency's data tone for each of OFDM block 1 and OFDM block 2 for Span1. This field can be expressed with a 2's complement in 0.5 dB steps.

The access network sets the ACBoundaryPilotToDataGain1 field to a power ratio of a non-zero frequency's pilot tone and a non-zero frequency's data tone for each of OFDM block 0 and OFDM block 3 for Span1. This field can be expressed with a 2's complement in 0.5 dB steps.

The access network sets the ACInternalPilotToDataGain2 field to a power ratio of a non-zero frequency's pilot tone to a non-zero frequency's data tone for each of OFDM block 1 and OFDM block 2 for Span2. This field can be expressed with a 2's complement in 0.5 dB steps.

Finally, the access network sets the ACBoundaryPilotToDataGain2 field to a power ratio of a non-zero frequency's pilot tone to a non-zero frequency's data tone for each of OFDM block 0 and OFDM block 3 for Span2. This field can be expressed with a 2's complement in 0.5 dB steps.

As can be understood from the foregoing description, in transmitting broadcast data, the mobile communication system changes transmission formats for initial transmission and retransmissions, increasing efficiency of radio resources and facilitating transmission of the broadcast data.

While the invention has been shown and described with reference to a certain preferred embodiment thereof, it will be understood by those skilled in the art that various changes in form and details may be made therein without departing from the spirit and scope of the invention as defined by the appended claims and the full scope of equivalents thereof.

What is claimed is:

1. A transmission method for a mobile communication system that supports multi-slot transmission' and hybrid Automatic Repeat Request (H-ARQ) and uses an Orthogonal Frequency Division Multiplexing (OFDM) transmission scheme, the method comprising:
   allocating, by a transmission apparatus, at least one OFDM symbol to a transmission slot as an internal symbol, and allocating at least one OFDM symbol to each of a left side and a right side of the internal symbol as a boundary symbol; and
   transmitting, by the transmission apparatus, the OFDM symbol such that the boundary symbol and the internal symbol differ from each other in a pilot-to-data tone power ratio (PDR) in a first slot interval where initial transmission is performed and a second slot interval where retransmission is performed.

2. The transmission method of claim 1, wherein a PDR of the boundary symbol is higher than a PDR of the internal symbol.

3. The transmission method of claim 1, further comprising:
   varying a cyclic prefix (CP) length of the OFDM symbol in the second slot interval at each retransmission.

4. The transmission method of claim 1, further comprising:
   varying a modulation order of the OFDM symbol in the second slot interval at each retransmission.

5. The transmission method of claim 1, further comprising:
   broadcasting a broadcast overhead message including transmission format information applied to each of the first and second slot intervals if the mobile communication system is a broadcast system, wherein the transmission format information includes information related to setting of the PDR.

6. The transmission method of claim 1, wherein the mobile communication system is a High Rate Packet Data (HRPD) system that transmits the broadcast physical layer packet.

7. A method for receiving a broadcast physical layer packet in a mobile communication system that supports multi-slot transmission and hybrid Automatic Repeat Request (H-ARQ) and uses an Orthogonal Frequency Division Multiplexing (OFDM) transmission scheme, the method comprising:
   receiving, by a reception apparatus, transmission format information including pilot-to-data tone power ratio (PDR) information for at least one first slot interval where initial transmission for the broadcast physical layer packet is performed and at least one second slot interval where retransmission is performed, through a broadcast overhead message; and
   receiving, by the reception apparatus, the broadcast physical layer packet by performing channel estimation for a corresponding slot interval based on the PDR information;
   wherein at least one OFDM symbol is allocated as an internal symbol and at least one OFDM symbol is allocated to each of a left side and a right side of the internal symbol as a boundary symbol in each of the first and second slot intervals, and the PDR set in the first slot interval is different from the PDR set in the second slot interval.

8. The method of claim 7, wherein the PDR of the boundary symbol is higher than the PDR of the internal symbol.

9. A transmission apparatus for a mobile communication system that supports multi-slot transmission and hybrid Automatic Repeat Request (H-ARQ) and uses an Orthogonal Frequency Division Multiplexing (OFDM) transmission scheme, the apparatus comprising:
   a transmission unit for allocating at least one OFDM symbol to a transmission slot as an internal symbol, allocating at least one OFDM symbol to each of a left side and a right side of the internal symbol as a boundary symbol, and transmitting the OFDM symbol, the transmission unit including a pilot tone inserter for inserting a pilot tone in the OFDM symbol; and
   a controller for controlling an operation of the pilot tone inserter such that the boundary symbol and the internal symbol differ from each other in a pilot-to-data tone power ratio (PDR) in a first slot interval where initial transmission is performed and a second slot interval where retransmission is performed.

10. The transmission apparatus of claim 9, wherein the controller controls an operation of the pilot tone inserter such that a PDR of the boundary symbol is higher than a PDR of the internal symbol.

11. The transmission apparatus of claim 9, wherein the controller controls an operation of the transmission unit such that a cyclic prefix (CP) length of the OFDM symbol varies in the second slot interval at each retransmission.

12. The transmission apparatus of claim 9, wherein the controller further controls an operation of the transmission unit such that a modulation order of the OFDM symbol varies in the second slot interval at each retransmission.

13. The transmission apparatus of claim 9, wherein the controller generates and broadcasts a broadcast overhead message including transmission format information applied to each of the first and second slot intervals using the transmission unit, wherein the transmission format information includes information related to setting of the PDR.

14. The transmission apparatus of claim 9, wherein the mobile communication system is a High Rate Packet Data (HRPD) system that transmits the broadcast physical layer packet.

15. An apparatus for receiving a broadcast physical layer packet in a mobile communication system that supports multi-slot transmission and hybrid Automatic Repeat Request (H-ARQ) and uses an Orthogonal Frequency Division Multiplexing (OFDM) transmission scheme, the apparatus comprising:
   a reception unit for receiving transmission format information including pilot-to-data tone power ratio (PDR) information for at least one first slot interval where initial transmission for the broadcast physical layer packet is performed and at least one second slot interval where retransmission is performed, through a broadcast overhead message, and receiving the broadcast physical layer packet, the reception unit including a channel estimator for performing channel estimation for a corresponding slot interval based on the PDR information; and
   a controller for, upon receipt of the broadcast overhead message, controlling an operation of the channel estimator according to the PDR information, and controlling an overall operation of the reception unit according to the transmission format information;
   wherein at least one OFDM symbol is allocated as an internal symbol and at least one OFDM symbol is allocated to each of a left side and a right side of the internal symbol as a boundary symbol in each of the first and second slot intervals, and the PDR set in the first slot interval is different from the PDR set in the second slot interval.

16. The apparatus of claim 15, wherein the PDR of the boundary symbol is higher than the PDR of the internal symbol.

* * * * *